US012657243B2

(12) United States Patent
Lefeve et al.

(10) Patent No.: US 12,657,243 B2
(45) Date of Patent: Jun. 16, 2026

(54) SYSTEMS AND METHODS FOR DATA PRIORITIZATION, DISTRIBUTION, AND MANAGEMENT

(71) Applicant: MedeAnalytics, Inc., Richardson, TX (US)

(72) Inventors: Christian Lefeve, Nashville, TN (US); Michael Doeff, San Francisco, CA (US); David Bartley, Brentwood, TN (US); Yevhenii Ulianko, Kharkiv Oblast (UA)

(73) Assignee: MedeAnalytics, Inc., Richardson, TX (US)

( * ) Notice: Subject to any disclaimer, the term of this patent is extended or adjusted under 35 U.S.C. 154(b) by 0 days.

(21) Appl. No.: 18/595,068

(22) Filed: Mar. 4, 2024

(65) Prior Publication Data

US 2025/0278439 A1      Sep. 4, 2025

(51) Int. Cl.
*G06F 16/904*      (2019.01)
*G06F 3/04847*      (2022.01)

(52) U.S. Cl.
CPC ........ *G06F 16/904* (2019.01); *G06F 3/04847* (2013.01)

(58) Field of Classification Search
None
See application file for complete search history.

(56) References Cited

U.S. PATENT DOCUMENTS

| | | | | |
|---|---|---|---|---|
| 9,959,506 B1* | 5/2018 | Karppanen | ......... | G06F 16/9574 |
| 11,632,374 B2* | 4/2023 | Spurlock | ................. | H04L 63/10 |
| | | | | 726/2 |
| 2018/0173372 A1* | 6/2018 | Greenspan | .......... | G06F 16/2465 |
| 2018/0211197 A1* | 7/2018 | Vosseler | ................. | G06Q 50/10 |
| 2020/0151162 A1* | 5/2020 | Hubbard | ............... | H04L 67/12 |
| 2020/0377301 A1* | 12/2020 | Chila | ................... | G06Q 20/203 |
| 2022/0084664 A1* | 3/2022 | Ginsburg | ............... | G16H 15/00 |

\* cited by examiner

*Primary Examiner* — Dawaune A Conyers
(74) *Attorney, Agent, or Firm* — Sterne, Kessler, Goldstein & Fox P.L.L.C.

(57) ABSTRACT

Disclosed herein are system, method, and computer program product embodiments for intelligent data retrieval, caching, and display. In some embodiments, the system generates a (GUI) in response to a request from a user device. The system may receive the location of the user device and identification of an initiative from the user device. The system may identify a metric correlated with the initiative based on an analysis of previously received initiatives. The system may identify and retrieve a value of the metric from a data source storing a plurality of metrics. The system may store the metric value at a local data store closer in proximity to the user device than the plurality of metrics at the data source. The system may then generate an updated graphical user interface (GUI) with the initiative, metric, and metric value.

20 Claims, 16 Drawing Sheets

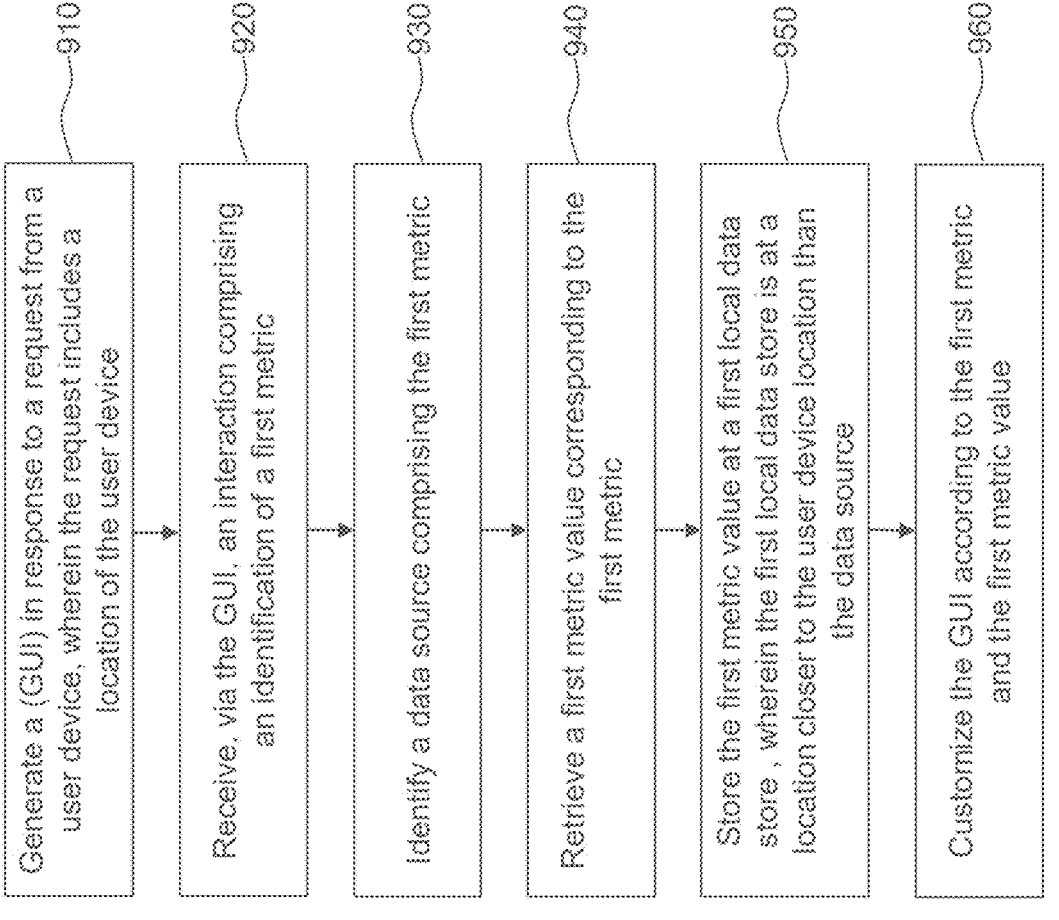

Generate a (GUI) in response to a request from a user device, wherein the request includes a location of the user device — 910

Receive, via the GUI, an interaction comprising an identification of a first metric — 920

Identify a data source comprising the first metric — 930

Retrieve a first metric value corresponding to the first metric — 940

Store the first metric value at a first local data store, wherein the first local data store is at a location closer to the user device location than the data source — 950

Customize the GUI according to the first metric and the first metric value — 960

1010 — Configure a batch process to retrieve a first metric value

1020 — Execute the batch process according to the update frequency

1030 — Update the first metric value at the first local data store

1000

1110

Detect the user device moved from a location to an updated location

1120

Identify a second local data store that is at a location closer to the updated user device location than the first local data store

1130

Store the first metric value at the second local data store

1100

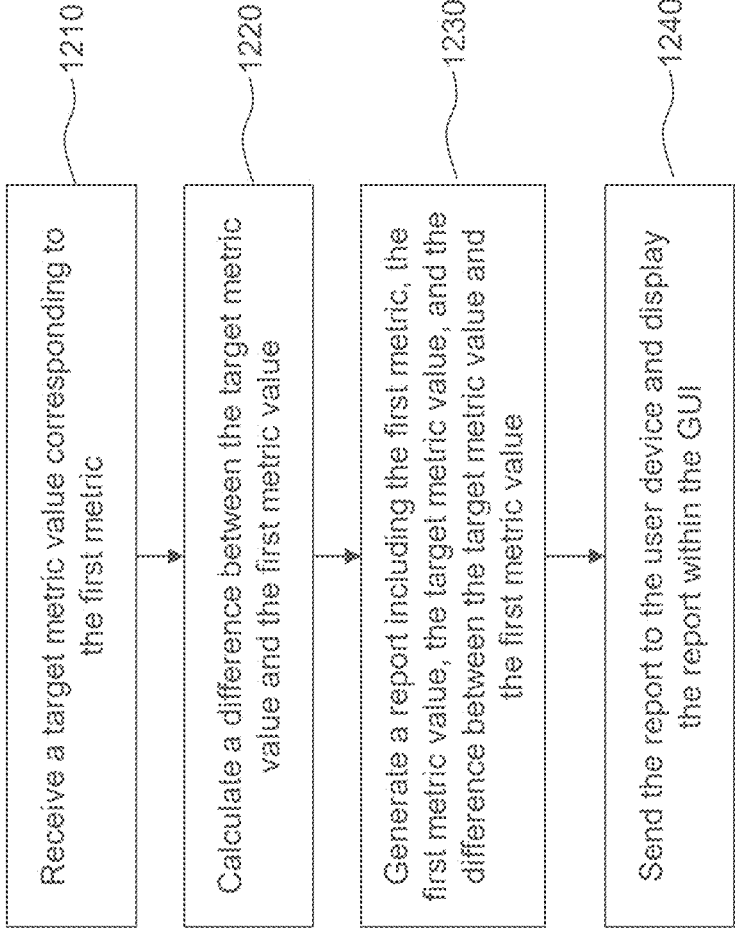

1200

1210 Receive a target metric value corresponding to the first metric

1220 Calculate a difference between the target metric value and the first metric value 1230 Generate a report including the first metric, the first metric value, the target metric value, and the difference between the target metric value and the first metric value 1240 Send the report to the user device and display the report within the GUI

FIG. 12

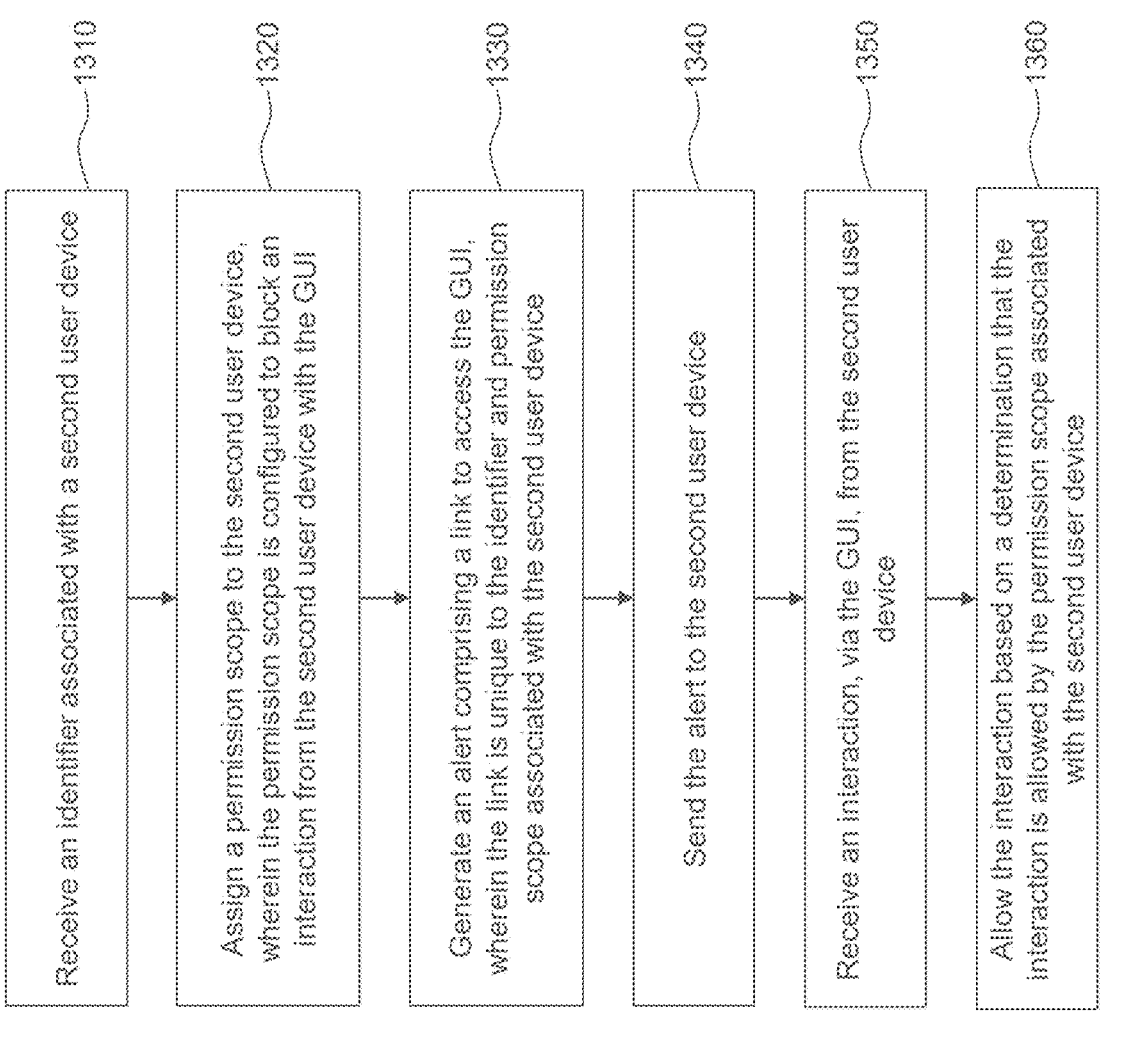

Receive an identifier associated with a second user device ⟋1310

Assign a permission scope to the second user device, wherein the permission scope is configured to block an interaction from the second user device with the GUI ⟋1320

Generate an alert comprising a link to access the GUI, wherein the link is unique to the identifier and permission scope associated with second user device ⟋1330

Send the alert to the second user device ⟋1340

Receive an interaction, via the GUI, from the second user device ⟋1350

Allow the interaction based on a determination that the interaction is allowed by the permission scope associated with the second user device ⟋1360

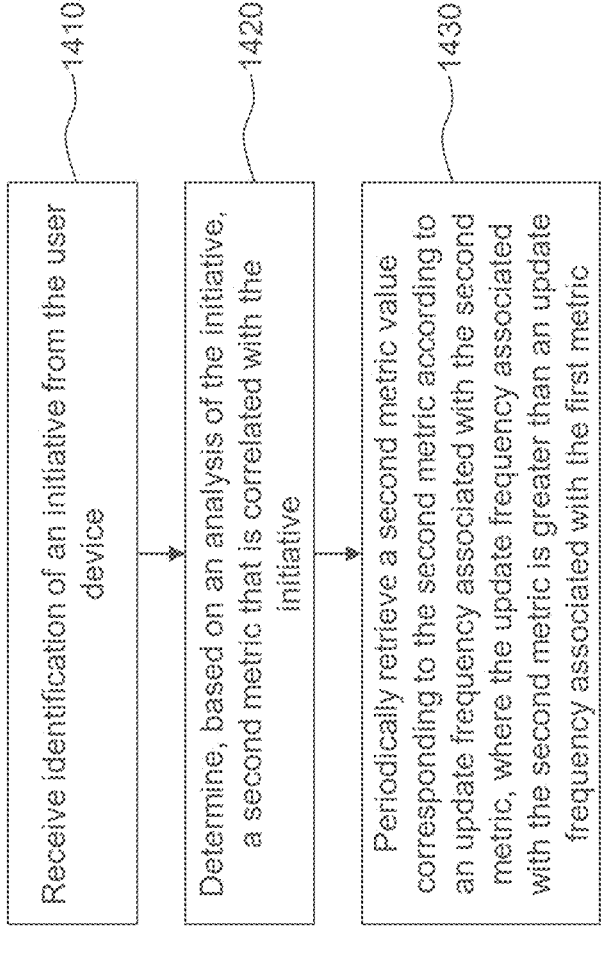

1410

Receive identification of an initiative from the user device

1420

Determine, based on an analysis of the initiative, a second metric that is correlated with the initiative

1430

Periodically retrieve a second metric value corresponding to the second metric according to an update frequency associated with the second metric, where the update frequency associated with the second metric is greater than an update frequency associated with the first metric

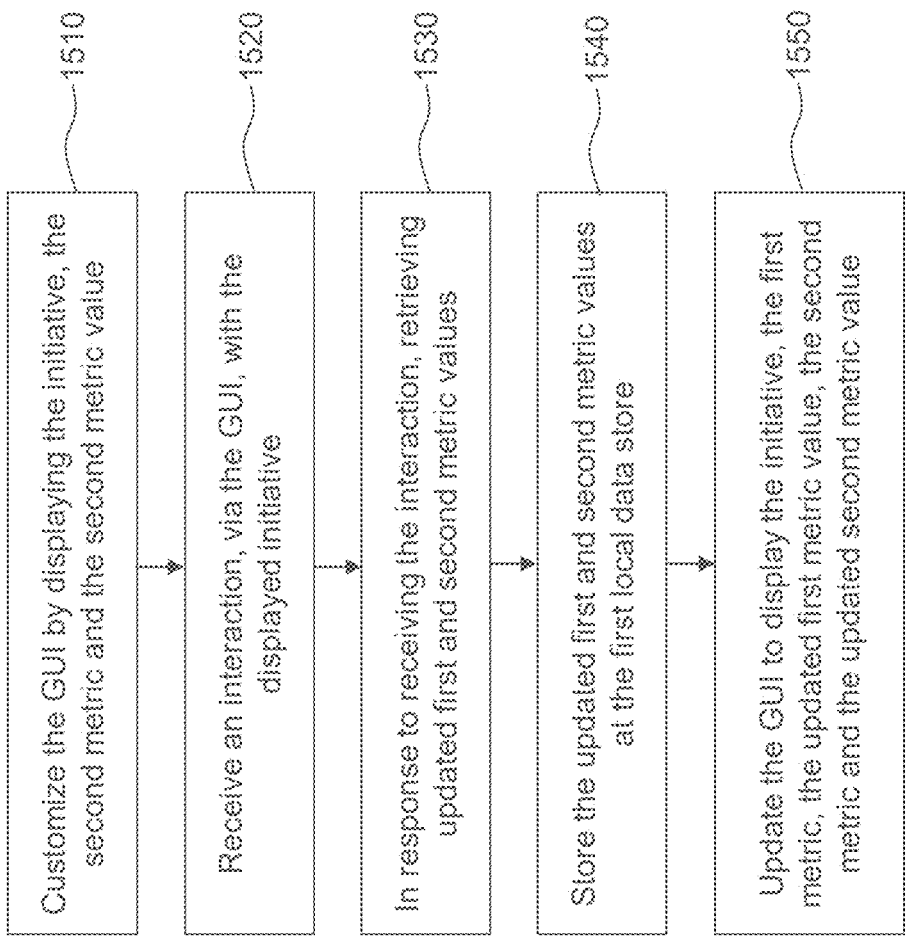

Customize the GUI by displaying the initiative, the second metric and the second metric value ～1510

Receive an interaction, via the GUI, with the displayed initiative ～1520

In response to receiving the interaction, retrieving updated first and second metric values ～1530

Store the updated first and second metric values at the first local data store ～1540

Update the GUI to display the initiative, the first metric, the updated first metric value, the second metric and the updated second metric value ～1550

SYSTEMS AND METHODS FOR DATA PRIORITIZATION, DISTRIBUTION, AND MANAGEMENT

BACKGROUND

In enterprise computing environments, data may be distributed across different enterprise applications, data repositories, and physical locations, and may be accessed by devices from different physical locations. However, in instances where a large amount of data is stored, accessing the data may lead to network bottlenecks. For example, if multiple client devices request access to the same data, handling the requests may result in a bottleneck at the data source. The bottleneck may result in lengthy response times or connection timeouts. Furthermore, certain applications (e.g., banking, healthcare) may require high-fidelity and real-time information. In these fields, it is imperative that the results be accessed promptly and reflect the ground truth. Therefore, a method to efficiently retrieve stored data, without causing network bottlenecks, is needed.

Even if a device is capable of accessing the stored data, it may be difficult to determine how to prioritize what data to retrieve or display. In a big data environment, it is impractical for a human to sift through the data to determine what is important. For example, a database may include millions of data entries. It would be impractical to display every data point within the database. Thus, there is a need to not only efficiently retrieve stored data, but to also identify and display data that is most relevant to a requester. And the need to efficiently identify and display critical information is especially acute when data is accessed on mobile devices, which are typically equipped with small screens that limit the amount of information that can be displayed.

BRIEF SUMMARY

Disclosed herein are system, apparatus, device, method and/or computer program product embodiments, and/or combinations and sub-combinations thereof, for intelligent data retrieval, caching, and display. Some embodiments relate to a method comprising: generating a (GUI) in response to a request from a user device, where the request includes a location of the user device; receiving, via the GUI, an interaction comprising an identification of a first metric; identifying a data source comprising the first metric; retrieving a first metric value corresponding to the first metric; storing the first metric value at a first local data store, where the first local data store is at a location closer to the user device location than the data source; and customizing the GUI according to the first metric and the first metric value.

Some embodiments relate to a system comprising: a memory; and at least one processor coupled to the memory and configured to: generate a (GUI) in response to a request from a user device, where the request includes a location of the user device; receive, via the GUI, an interaction comprising an identification of a first metric; identifying a data source comprising the first metric; retrieve a first metric value corresponding to the first metric; store the first metric value at a first local data store, where the first local data store is at a location closer to the user device location than the data source; and customize the GUI according to the first metric and the first metric value.

Some embodiments relate to a non-transitory computer-readable device having instructions stored thereon. When the instructions are executed by at least one computing device, the instructions cause the at least one computing device to perform operations comprising: generating a (GUI) in response to a request from a user device, where the request includes a location of the user device; receiving, via the GUI, an interaction comprising an identification of a first metric; identifying a data source comprising the first metric; retrieving a first metric value corresponding to the first metric; storing the first metric value at a first local data store, where the first local data store is at a location closer to the user device location than the data source; and customizing the GUI according to the first metric and the first metric value.

BRIEF DESCRIPTION OF THE DRAWINGS

The accompanying drawings are incorporated herein and form a part of the specification.

FIG. 9 is a flowchart illustrating an example process for data prioritization, distribution, and management, according to some embodiments.

FIG. 12 is a flowchart illustrating an example process for utilizing a target metric value, according to some embodiments.

FIG. 13 is a flowchart illustrating an example process for adding a second user to an initiative, according to some embodiments.

FIG. 14 is a flowchart illustrating an example process for using an initiative to identify additional metrics, according to some embodiments.

FIG. 15 is a flowchart illustrating an example process for displaying multiple metrics, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for data prioritization, distribution, and management. The embodiments may be configured to retrieve and cache data at locations close to end-user devices. Data may be cached at an end-user device's request, based on a system prediction, or a combination of both. For example, the system may predict, based on previous user device interactions, data that may be useful to a current user device. In response, the system may preemptively retrieve and locally store the predicted data. The system may further update storage locations based on the location of the end-user device. For example, if the system detects the end-user device location has changed, the system may identify a new storage location closer to the end-user device where data relevant to the user may be stored.

Embodiments may further support an application operated by end-user devices. The end-user application may be operated by a user device to view, manage, and otherwise interact with the cached data. By intelligently determining data to be cached, and storing the selected data in close proximity to users, embodiments enable high fidelity, real-time data access while reducing concurrent database access and avoiding network bottlenecks. Embodiments further enable users to quickly locate and view critical data within a single graphical user interface.

Figure 1:
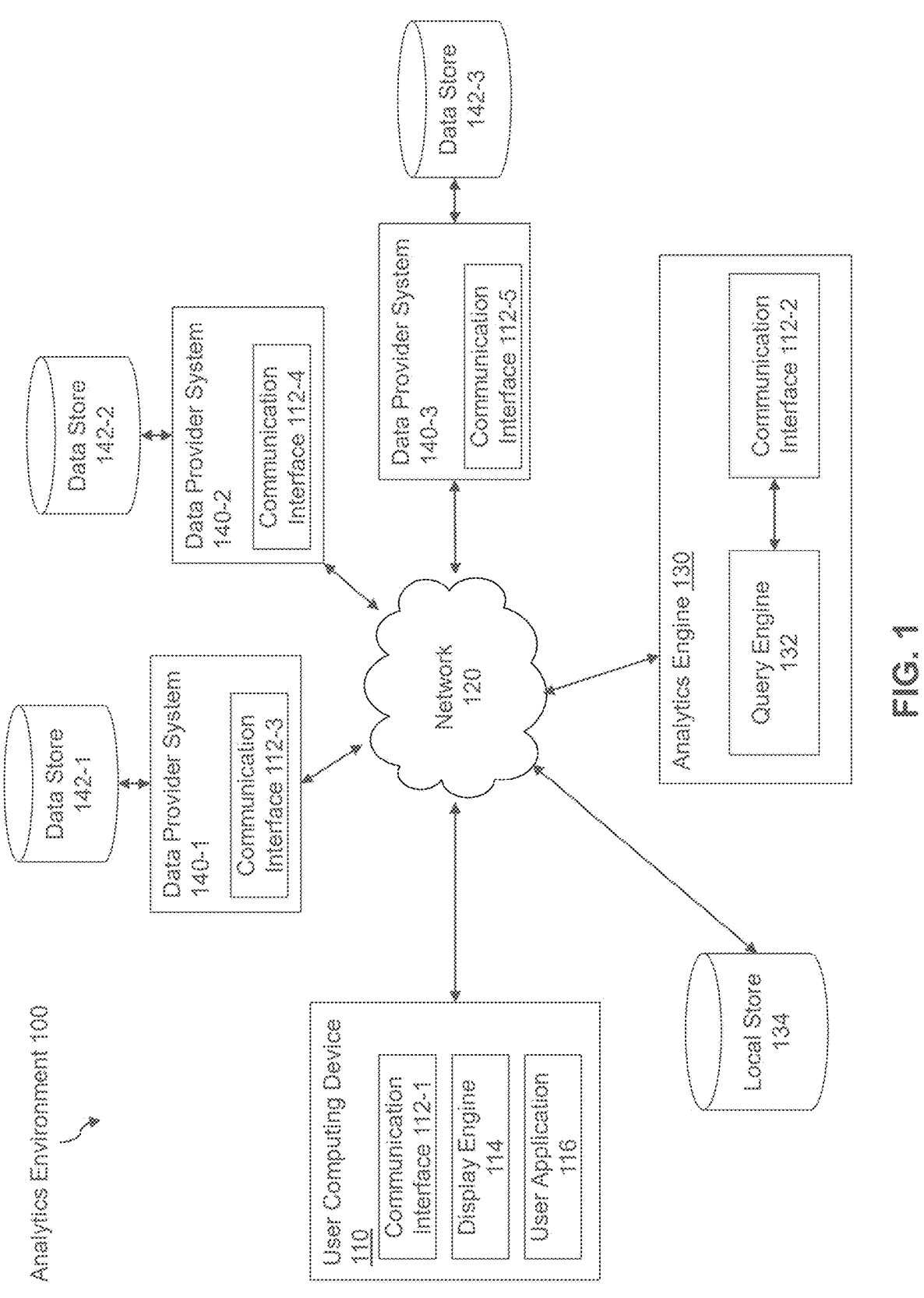
FIG. 1 depicts an exemplary environment for data prioritization, distribution, and management, according to some embodiments.

FIG. 1 depicts an exemplary analytics environment 100 for data prioritization, distribution, and management, according to some embodiments. Analytics environment 100 includes user computing device 110, network 120, analytics engine 130, local store 134, data provider systems 140-1, 140-2, and 140-3, and data store 142.

User computing device 110 may be any entity attempting to communicate with analytics engine 130. Although a single user computing device 110 is depicted for purposes of discussion, analytics environment 100 may include multiple user computing devices 110. User computing device 110 may be a computer system such as computer system 1600 described with reference to FIG. 16. User computing device 110 may be a client system such as a desktop workstation, laptop or notebook computer, netbook, tablet, smart phone, and/or other computing device capable of communicating over network 120.

User computing device 110 includes communication interface 112-1, display engine 114, and user application 116. Communication interface 112-1 may be configured to communicate with analytics engine 130 via network 120. Communication interface 112-1 may comprise any suitable network interface capable of transmitting and receiving data, such as, for example a modem, an Ethernet card, a communications port, or the like. Communication interface 112-1 may be able to transmit data using any wireless transmission standard such as, for example, Wi-Fi, Bluetooth, cellular, or any other suitable wireless transmission. Display engine 114 may be configured to display information at user computing device 110. Display engine 114 may be configured to receive interactions from a user. An interaction may refer to various forms of user input, for example, a click, a button press, a swipe, etc. User application 116 may interact with analytics engine 130 to retrieve and display data stored in local store 134. In some embodiments, user application 116 may be a native application installed on user computing device 110. In some embodiments, user application 116 may be a web application accessed by user computing device 110. In such a case, the web application may be hosted by analytics engine 130 or on a separate server connected to network 120. A user may access, view, and interact with user application 116 via display engine 114.

In some embodiments, user computing device 110 may use user application 116 to define initiatives, which may be transmitted to analytics engine 130. In a big data environment where large quantities of data are distributed across multiple data sources, such as many enterprise environments, it is impractical to manually sift through the data to identify useful information. To aid the identification of information useful to particular users, embodiments enable initiatives to be defined. The initiative may be used to describe a problem or goal of the user or an organization with which the user is associated. For example, an initiative may be defined to increase network throughput or decrease network latency. As another example, an initiative may be defined to increase the efficiency of an organizational process or workflow. As yet another example, an initiative may be defined to increase revenue or profitability. In some embodiments, initiatives may be automatically defined or suggested by analytics engine 130 based on various factors, such as user roles, past user activity, or other initiatives defined by the user or organization. Analytics engine 130 may suggest additional initiatives based on attributes associated with existing initiatives. For example, user computing device 110 may define an initiative to reduce costs associated with a hospital's psychiatric department. Based on the initiative, analytics engine 130 may be configured to recommend an additional initiative to reduce costs associated with the hospital's surgery department.

User computing device 110 may further define data or metrics associated with an initiative. As will be discussed further below, analytics engine 130 may receive the initiative, determine relevant data metrics, and store the data associated with each metric in close proximity to user computing device 110. This configuration: (1) decreases network bottlenecks by distributing data to local data stores, reducing the number of user computing devices 110 accessing the same data store; (2) increases access speed by staging data near user computing device 110; and (3) analytics engine 130 may use previous interactions from other user computing devices 110 to suggest and preemptively retrieve additional metrics. User computing device 110 may communicate with analytics engine 130 via network 120.

Network 120 may be any type of computer or telecommunications network capable of communicating data, for example, a local area network, a wide-area network (e.g., the Internet), or any combination thereof. The network may include wired and/or wireless segments. Network 120 may also represent or include segments corresponding to a secure enterprise network.

Analytics environment 100 may also include one or more data provider systems 140. For example, analytics environment 100 includes data provider systems 140-1, 140-2, and 140-3. Each data provider system 140 may have and manage data within its own data store 142.

Each data store 142 may be implemented using a memory storage device. Each data store 142 may be configured to store various data associated with the corresponding data provider system 140, which may be accessed by analytics engine 130. Data store 142 may be organized according to various schemes and may employ one or more databases for storing and organizing data. Data provider system 140 may use communications interface 112 to access network 120.

As depicted, data within analytics environment 100 may be disparate and fragmented across multiple data provider systems 140. For example, data provider systems 140 may represent different systems within an enterprise organization (e.g., billing system, customer relationship management system, network monitoring system, etc.), or systems associated with different organizations or departments within an organization. By utilizing analytics engine 130, selective data from each data provider system 140 may be retrieved and stored in close proximity to user computing device 110. This may reduce bottlenecks at network 120 while providing user computing device 110 real-time data access. Additionally, analytics engine 130 may provide user computing device 110 data it may not have previously attempted to access. For example, user computing device 110 may define an initiative and desire data metrics maintained by data provider system 140-1. Analytics engine 130 may analyze the initiative and determine additional data relevant to the initiative that is maintained by data provider system 140-2. This determination may be based on, for example, the result of a machine learning model prediction and/or analysis of initiatives from other user computing devices 110.

Analytics engine 130 may be implemented using one or more servers and/or databases. In some embodiments, analytics engine 130 may be implemented using a computing device such as a desktop workstation, laptop or notebook computer, netbook, tablet, smart phone, and/or other computing device. In some embodiments, analytics engine 130 may be implemented as an application in an enterprise computing system and/or a cloud-computing system. In some embodiments, analytics engine 130 may be implemented on a computer system such as computer system 1600 described with reference to FIG. 16. Although a single analytics engine 130 is depicted, analytics environment 100 may include multiple analytics engines 130.

Analytics engine 130 includes query engine 132 and communication interface 112-2. Analytics engine 130 may be in communication with local store 134. Local store 134 may be a storage device configured to store data from data stores 142-1, 142-2, and 142-3. Local store 134 may employ one or more databases for storing and organizing data.

Query engine 132 may be configured to retrieve data from each of data provider systems 140-1, 140-2, and 140-3, and save it to local store 134. Query engine 132 may communicate, through communication interface 112-2, with each of data provider systems 140-1, 140-2, and 140-3 via network 120. Query engine 134 may be configured to retrieve certain metrics from a data provider system 140. As discussed above, user computing device 110 may define and send an initiative to analytics engine 130. User computing device 110 may also send metrics associated with the initiative. In some embodiments, analytics engine 130 may determine, based on the initiative, additional metrics that query engine 132 should retrieve. The metric may be a type of data. For example, for a healthcare organization, a metric may be average surgery cost per month. A metric may have a corresponding metric value, for example $1,000,000.

In some embodiments, each time query engine 132 obtains a new metric value, it may overwrite the current value at local store 134. Such a process is beneficial to store the most up-to-date information as well as reduce the amount of storage local store 134 requires. In some embodiments, query engine 132 may be configured to maintain a history of metric values at local store 134. For example, a metric value may be updated once per day, and local store 134 may be configured to keep the last thirty metric values. In this embodiment, once thirty metric values are stored at local store 134, query engine 132 may overwrite the oldest metric value. Storing a limited history of metric values allows local store 134 to remain small while also providing user computing device 110 the benefit of historical data.

Query engine 134 may be further configured to retrieve metrics and metric values that analytics engine 130 determines are linked to the initiative received from user computing device 110. In some embodiments, the determination may be made via a historical analysis of previous initiatives. For example, an initiative may involve reducing heart surgery costs. Analytics engine 130 may determine that surgery costs vary based on region. In this example, query engine 132 may be configured to retrieve metric values for average surgery costs in the region local to user computing device 110.

In some embodiments, analytics engine 130 may also use artificial intelligence to determine which metrics to retrieve based on the initiative. In some embodiments, analytics engine 130 may use a trained machine learning model to identify which metrics to retrieve. For example, analytics engine 130 may include a list of previously received initiatives, metrics and target metrics (i.e., goals) for each initiative, and the time to reach each target metric. Analytics engine 130 may use this information to determine which metrics may be most effective for each initiative. For instance, analytics engine 130 may have received the same initiative (e.g., reduce orthopedic surgery waste) from two different user computing devices 110. Each user computing device 110 may have indicated different metrics to track associated with the initiative. For example, the first user computing device 110 may have tracked time spent per surgery, while the second user computing device 110 may have tracked the value of material lost per surgery. Here, the second user computing device 110 may have reached their target metric faster than the first user computing device 110. Analytics engine 130 may use this information to recommend a metric tracking the value of material lost per surgery upon receiving a new initiative associated with reducing surgical costs.

Analytics engine 130 may use data associated with existing or past initiatives to train a machine learning model capable of linking metrics and initiatives. Use of such machine-learning techniques may be beneficial to accurately identify data metrics useful for tracking and evaluating the progress of certain initiatives, which often may not be known or obvious to users defining initiatives. Analytics engine 130 may additionally use reinforcement learning to update a machine learning model. Reinforcement learning may involve receiving scores or feedback from user computing device 110 in response to analytics engine's 130 actions. For example, analytics engine 130 may recommend additional metrics to user computing device 110 based on the output of a machine learning model. User computing device 110 may send a score for each recommended metric to analytics engine 130. Analytics engine 130 may re-train the machine learning model while taking the received scores into account. This feedback may be beneficial to improve analytics engine's 130 ability to recommend metrics based on initiatives.

In some embodiments, query engine 132 may retrieve data according to an update frequency or schedule. For example, query engine 132 may be configured to retrieve updated metric values from data stores 142 once a week, once a day, once an hour, etc. User computing device 110 may set the update frequency. Analytics engine 130 may be configured with a default update frequency (e.g., once per day). Query engine 132 may have an update frequency for each metric that it is configured to retrieve from data stores 142. Certain metrics may have higher priority than others and may be updated at higher frequencies. Analytics engine 130 may configure query engine 132 to execute a batch process. The batch process may include one or more metrics and an update frequency. Query engine 132 may execute the batch process, according to the update frequency, to retrieve metric values corresponding to the metrics. Metric values may be stored at local store 134.

Query engine 132 may retrieve data from multiple data provider systems 140. For example, query engine 132 may retrieve data from data provider system 140-1, 140-2, and 140-3. In some embodiments, data may be formatted differently across multiple data provider systems 140. Analytics engine 130 may be configured to reformat the received data so that each metric has the same format. For example, data provider system 140-1 may store average surgery cost per year and data provider system 140-2 may store average surgery cost per month. Here, analytics engine 130 may retrieve data from both data provider systems 140 but reformat data provider system's 140-2 data. For example, analytics engine 130 may multiply data provider system's 140-2 value by twelve so that both may be stored as cost per year. Such reformatting may be beneficial so that the received metrics and metric values may be consistent, compared, or aggregated. In some embodiments, analytics engine 130 may reformat the data prior to storing it at local store 134. In some embodiments, analytics engine 130 may reformat the data after it has been stored at local store 134.

In some embodiments, local store 134 may be in closer proximity to user computing device 110 than data provider systems 140. Such an architecture may have multiple benefits. First, because local store 134 is closer in proximity to user computing device 110 than data provider systems 140, the amount of time for user computing device 110 to access data is decreased. Local store 134 may also be configured to serve only users within a certain geographic proximity, limiting network traffic and reducing bottlenecks both at local store 134 and on network 120. Additionally, local store 134 may include only a subset of maintained by data provider systems 140, leading to faster data retrieval times. Furthermore, user computing device 110 may be a device with a small screen such as a cell phone. Therefore, it may be difficult for user computing device 110 to effectively visualize and interact with a large amount of data. By storing a subset of data from data provider systems 140 at local store 134, user computing device 110 may be able to effectively view and interact with the subset of data, even on a device such as a cell phone.

Analytics engine 130 may further be configured to communicate with user computing device 110. For example, analytics engine 130 may be further configured to send notifications or alerts. Notifications may be sent as SMS messages, emails, and/or phone calls. Notifications may also be sent through an application (e.g., user application 116) installed on or accessible from user computing device 110. The notification may include a link that, when interacted with, launches a GUI providing an interface to analytics engine 130. In some embodiments, analytics engine 130 may send a notification to user computing device 110 when a metric value reaches a target metric value. In some embodiments, analytics engine 130 may send a notification to user computing device 110 when a metric value differs from a target metric value by a predefined threshold. For example, a metric may be monthly revenue and a target metric value may be set to $1,000,000. In this example, lower and upper threshold values may be set at $800,000 and $1,200,000, respectively. If analytics engine 130 detects that a metric value for monthly revenue falls outside of these lower and upper thresholds, analytics engine 130 may send a notification to user computing device 110. In some embodiments, an alert may launch user application 116 (if not already executing) and cause user application 116 to show the metric (e.g., monthly revenue), metric value (e.g., $700 k), and target metric value (e.g., $1 million).

Analytics engine 130 may be further configured to automatically send updated metric values to user computing device 110. In some embodiments, user computing device 110 may require rapid access to its initiatives along with the initiative's metrics and metric values. In order to provide this on-demand access, analytics engine 130 may send updated metrics values to user application 116 at user computing device 110. As a result, a user interacting with user application 116 may be able to view the most up to date information, without having to wait for new metric values to be retrieved. The frequency that analytics engine 130 sends updates to user computing device 110 may vary. In some embodiments, analytics engine 130 may update user computing device 110 each time query engine 132 obtains new metric values. In some embodiments, user computing device 110 sets a frequency at which analytics engine 130 sends updated metric values.

Analytics engine 130 may add or associate additional users with current initiatives managed by analytics engine 130. Analytics engine 130 may automatically add users or add them based on a request. For example, a first user may send a request to analytics engine 130 to add a second user to an initiative. The message may be sent via user computing device 110. In response, analytics engine 130 may send a notification to user computing devices 110 associated with each user. The notification may state that the second user has been added to the initiative. Analytics engine 130 may automatically add or associate a user with an initiative based on an analysis of the initiative. For example, a user may define an initiative to reduce orthopedic surgery costs. In response, analytics engine 130 may be configured to add each orthopedic surgeon to the initiative without a request from the user.

Analytics engine 130 may further allow user computing devices 110 to send communications to other user computing devices 110. For example, a first user computing device 110 may access analytics engine 130 via user application 116 and send a message to a second user computing device 110. Messaging via analytics engine 130 may reduce network latency since metrics of interest may already be stored near analytics engine 130 at local store 134. Therefore, there may be little to no delay associated with retrieving metrics to send. In some embodiments, user application 116 may be configured to allow a user computing device 110 to send a link to a specific part of user application 116. For example, a metric may have fallen below a certain threshold and a first user computing device 110 may wish to communicate this to a second user computing device 110. In such a case, the first user computing device 110 may send a link, via user application 116, to a second user computing device 110. Once accessed, the link may cause second user computing device's 110 user application 116 to display the initiative, metric, and metric value.

Analytics engine 130 may associate a user operating computing device 110 with a permission scope or level. The permission scope may be used by analytics engine 130 to determine what actions user computing device 110 may take. Permissions may be defined in various manners. In some embodiments, permissions may be automatically defined according to users' roles within an organization or based on other known characteristics of users. In some embodiments, permissions may be manually defined by an administrator. For example, a team leader within an organization may be able to create new initiatives, edit existing initiatives, add metrics to existing initiatives, delete metrics from existing initiatives, view metric values, add and remove team members from initiatives, and set permissions for team members. In some embodiments, permissions may be assigned for individual initiatives. For example, a team leader may allow a first team member to add metrics to an initiative, but prevent a second team member from adding metrics to that same initiative.

Figure 2:
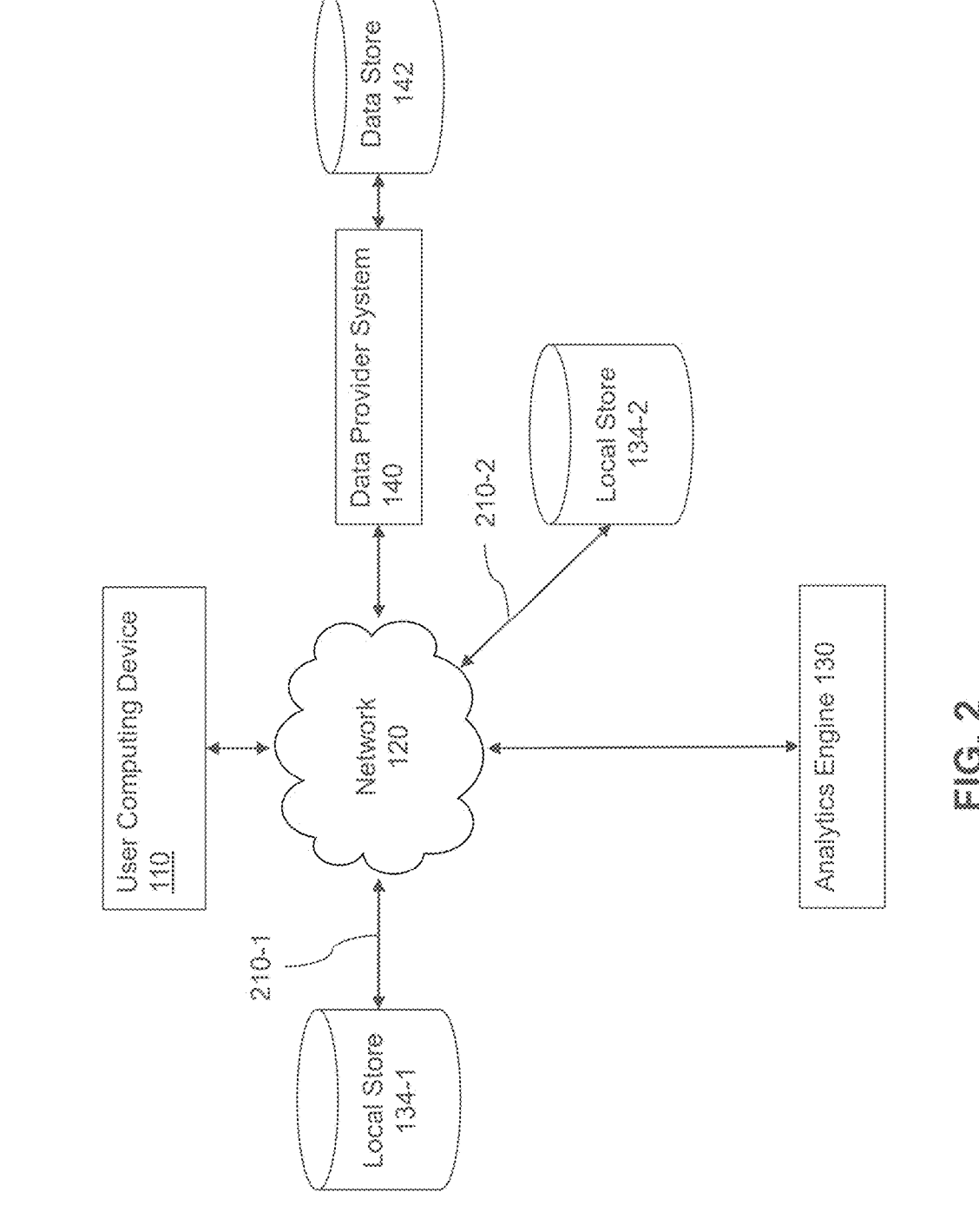
FIG. 2 depicts an exemplary environment including multiple local stores, according to some embodiments.

FIG. 2 depicts an exemplary environment 200 with multiple local stores 134, according to some embodiments. Analytics environment 200 includes analytics engine 130, user computing device 110, network 120, local stores 134-1 and 134-2, and data provider system 140. Although a single data provider system 140 is depicted, environment 200 may include multiple data provider systems 140. Analytics engine 130 may store data at local store 134-1 or 134-2 based on the distance or latency time between each local store 134 and user computing device 110. For example, distance 210-1 between user computing device 110 and local store 134-1 engine 130-1 may be less than distance 210-2 between user computing device 110 and local store 134-2. Here, metrics for user computing device 110 (e.g., metrics linked to initiatives associated with the user operating user computing device 110) may be stored at local store 134-1 instead of local store 134-2. This architecture may reduce network bottlenecks with multiple user devices 110 accessing a single local store 134. Additionally, staging metrics closer to the location of user device 110 reduces latency in providing critical metrics to user device 110.

Analytics engine 130 may update local store 134 based on user computing device 110 moving to an updated location. For example, user computing device 110 may move closer to local store 134-2. In response, analytics engine 130 may save data to local store 134-2 instead of local store 134-1. This may be beneficial to ensure that user computing device 110 has rapid access to data at local store 134. Analytics engine 130 may determine the location of user computing device 110 in various ways. In some embodiments, analytics engine 130 may request the location of user computing device 110. In some embodiments, analytics engine 130 may command each local store 134 to send a ping and measure the response time from user computing device 110. Analytics engine 130 may use the response times to determine which local store 134 is closest to user computing device 110.

Figure 3:
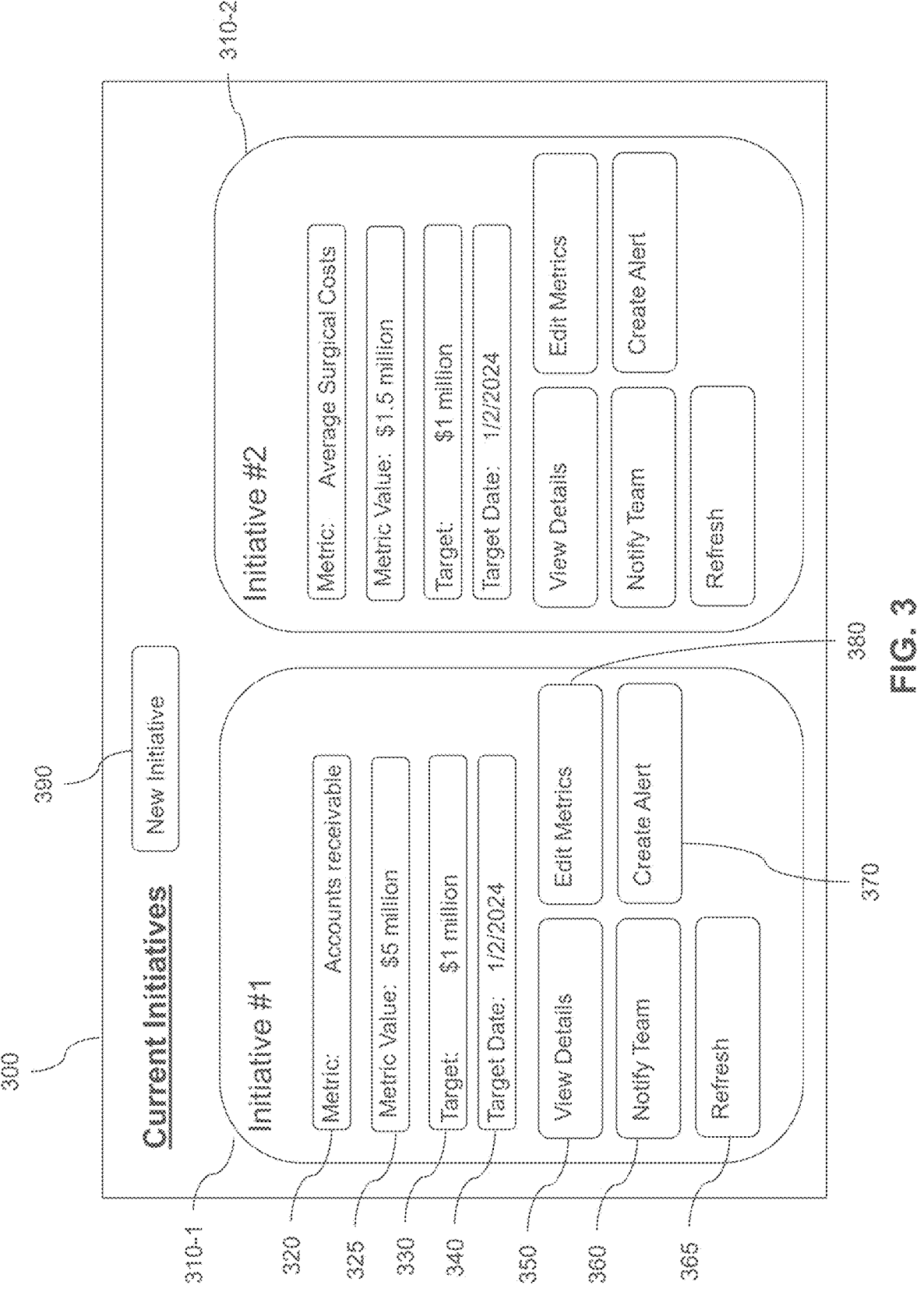
FIG. 3 depicts an exemplary interface for displaying initiatives, according to some embodiments.

FIG. 3 depicts an exemplary interface 300 for displaying initiatives, according to some embodiments. User computing device 110 may access interface 300 when it connects to analytics engine 130 via user application 116. Interface 300 includes initiative 310, metric 320, metric value 325, target 330, target date 340, view details 350, notify team 360, refresh 365, create alert 370, edit metrics 380, and new initiative 390. In some embodiments, user application 116 may be configured to automatically load interface 300 upon initiation of user application 116. Such operation enables the user operating user application 116 quick access to critical information relevant to the user, as discussed further below.

As depicted, interface 300 may display multiple initiatives, 310-1 and 310-2. Metric 320 may be a metric associated with initiative 310. Metric 320 may be a metric that analytics engine 130 may retrieve from data provider system 140 and store at local store 134. For example, metric 320 may be accounts receivable. Metric value 325 may be the value corresponding to metric 320. For example, metric 320 may be accounts receivable and metric value 325 may be $1 million. Target 330 may be a goal corresponding to metric 320. For example, target 330, corresponding to metric 320, may be $1 million. Target date 340 may be a date that user computing device 110 wishes metric 320 to reach target 330 by. Target date 340 may include a date and/or time. Initiative 310-1 and 310-2 may include multiple metrics 320, metric values 325, targets 330, and target dates 340.

View details 350 may enable user computing device 110 to view additional information regarding initiative 310. For example, initiative 310 may have multiple metrics 320 associated with it and interface 300 may display a limited set. User computing device 110 may identify which metrics 320 to display on interface 300. In some embodiments, analytics engine 130 may identify which metrics 320 to display. In some embodiments, analytics engine 130 may configure interface 300 to display a metric 320 with a metric value 325 that changed the most over a certain time period. In some embodiments, analytics engine 130 may configure interface 300 to display a metric 320 that is determined to have the most impact on initiative 310. In some embodiments, multiple metrics may be displayed for each initiative. In some embodiments, the number of metrics displayed may depend on available display real estate. In some embodiments, view details 350 may enable user computing device 110 to view each metric (or a larger subset of metrics) associated with the initiative stored at local store 134.

Displaying a limited set of metrics 320 may be advantageous. As stated above, in a big data environment, analytics engine 130 may have access to thousands or even millions of metrics. A large number of metrics may be tied to a single initiative. Even though these metrics may be stored at local store 134 for rapid access, it is impractical to display all of these metrics in interface 300. Additionally, user computing device 110 may be a device with a small screen (i.e., a cell phone) and therefore may not be able to display, in a useful manner, every metric. Therefore, analytics engine 130 may configure interface 300 to display the most important metrics 320, from local store 134, tied to each initiative 310. However, view details 350 may enable user computing device 110 to access additional other metrics 320 associated with initiative 310. For example, view details 350 may display an interface to view all (or a greater subset of) metrics stored at local store 134 associated with initiative 310. Interacting with view details 350 may launch a new GUI.

Notify team 360 may be used to send a notification or alert to users associated with initiative 310. Create alert 370 may launch a new GUI screen to create an alert that will generate and send an alert or notification to user computing devices 110 associated with initiative 310. The alert may also be automatically generated based on an event occurring (e.g., a metric passing a threshold). Edit metrics 380 may be used to edit metrics currently linked to initiative 310. For example, user computing device 110 may use edit metrics 380 to launch a new GUI screen to remove current metrics 320 and/or add new metrics 320 to initiative 310. For example, initiative 310 may be associated with reducing surgical costs, and have metric 320-1 associated with average surgery time. User computing device may click edit metrics 380, generating a new GUI, to add metric 320-2 associated with material lost per surgery. New initiative 390 may generate a new screen allowing user computing device 110 to create a new initiative 310.

Figure 4:
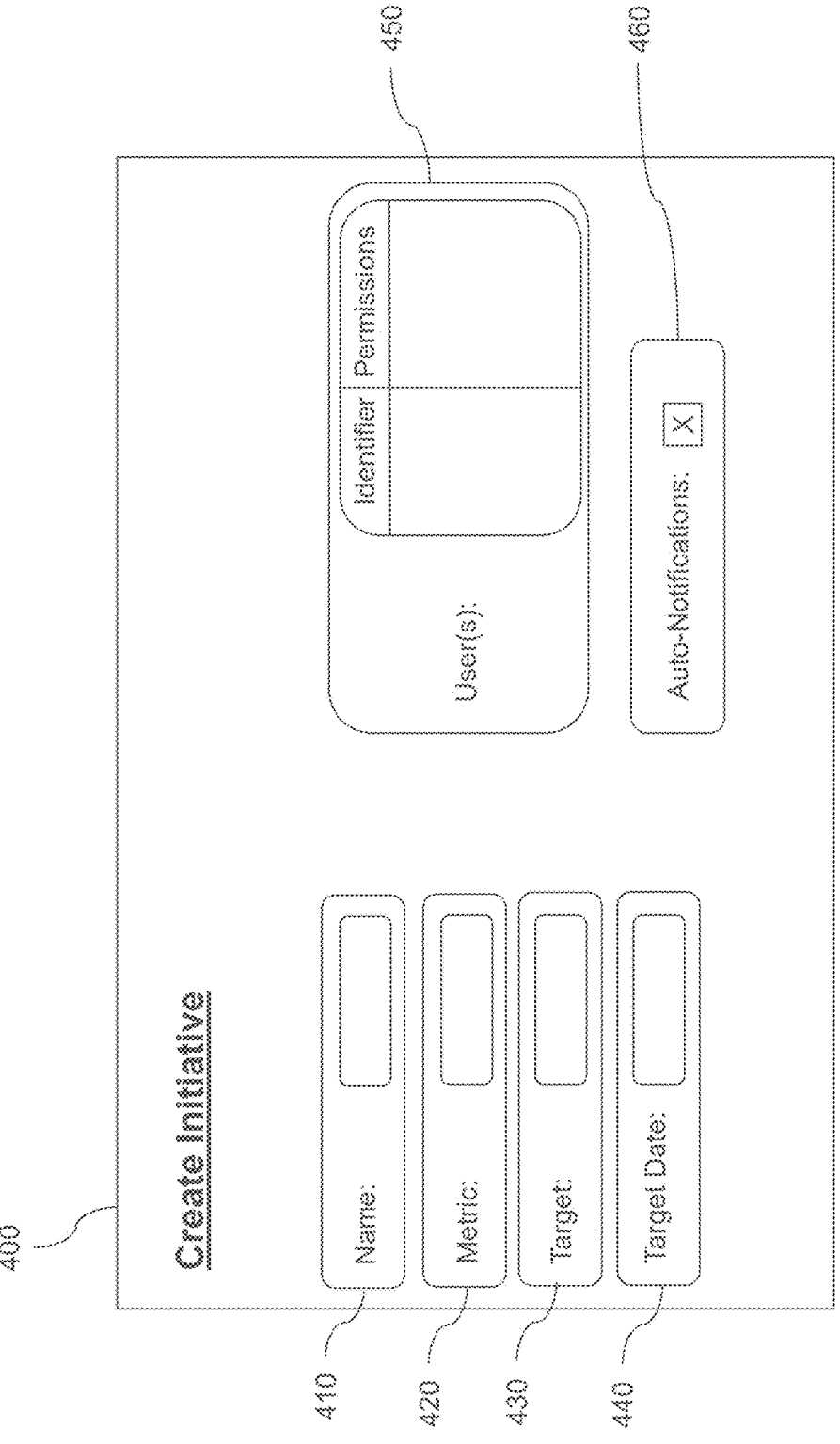
FIG. 4 depicts an exemplary interface for creating an initiative, according to some embodiments.

FIG. 4 depicts an exemplary interface 400 for creating an initiative, according to some embodiments. Interface 400 may be displayed as a result of user computing device 110 selecting new initiative 390. Interface 400 may be displayed on a computing device, such as user computing device 110, when accessing analytics engine 130. Interface 400 may include various fields, such as name 410, metric 420, target 430, target date 440, users 450, and notifications 460. As stated above, user computing device 110 may define an initiative for analytics engine 130 to retrieve metrics for. Name 410 may be a name to identify the initiative. Metric 420 may be a metric that analytics engine 130 may retrieve from data provider system 140. For example, metric 420 may be total claimants. Target 430 may be a goal corresponding to metric 420. For example, metric 420 may value of material wasted during surgical procedures and target 430 may be $0. Target date 440 may be a date by which user computing device 110 wishes metric 420 to reach target 430. Target date 440 may include a date and/or time.

Users 450 may correspond to other user computing devices 110 that may access the initiative created via interface 400. User computing device 110 may identify other user computing devices 110 by listing identifiers (e.g., email address, phone number, employee ID). User computing device 110 may set permissions associated with each identifier. As discussed above, permissions may be used by analytics engine 130 to determine what actions a user computing device 110 may perform on analytics engine 130. Once added within users 450, each user computing device 110 may receive an alert or notification with a link to access interface 300. Notifications 460 may be a checkbox indicating whether the user computing devices 110 should receive auto-notifications associated with the defined initiative. In some embodiments, notifications may be generated when metric 420 reaches a threshold value, such as target 430.

Figure 5:
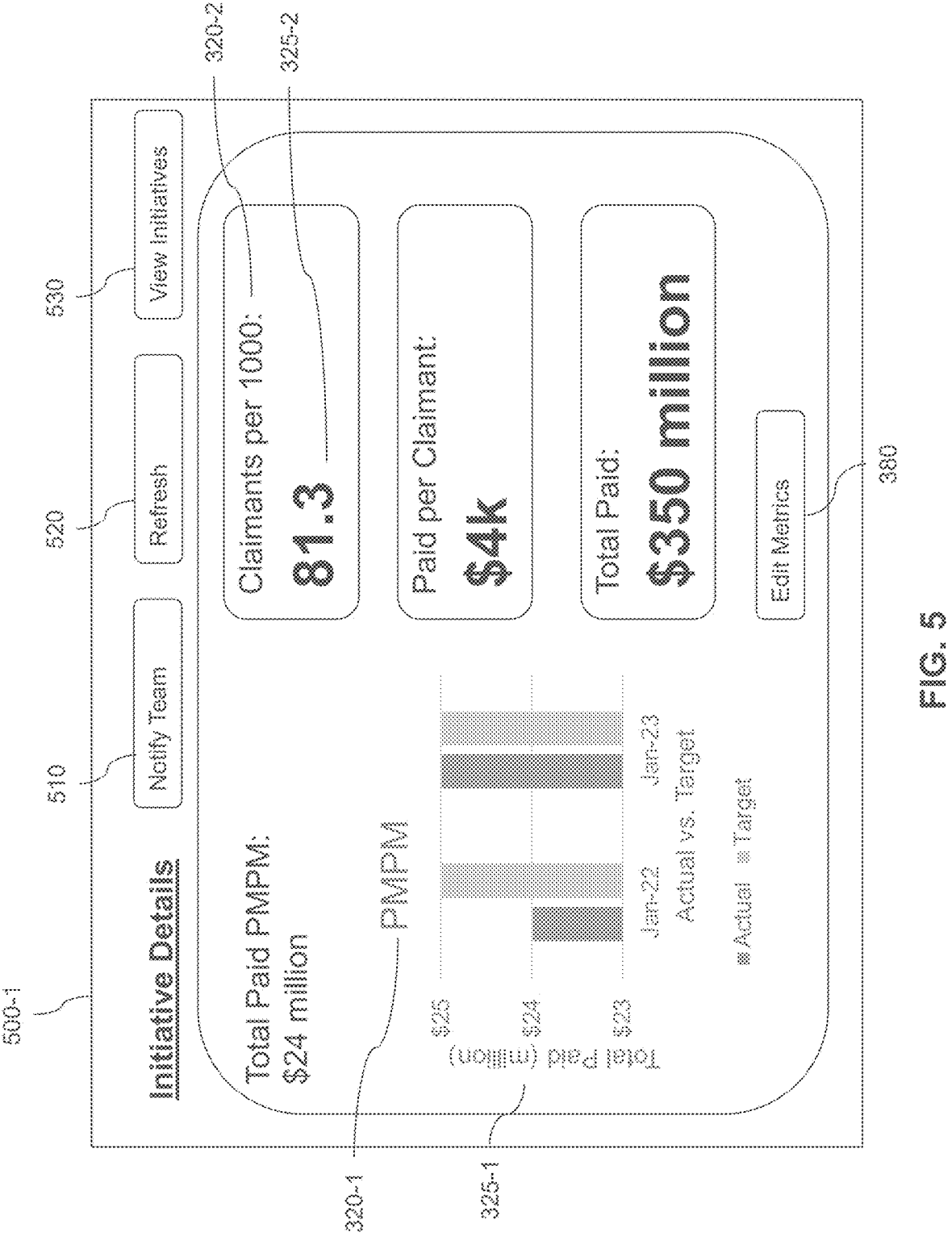
FIG. 5 depicts an exemplary interface for displaying initiative details, according to some embodiments.

FIG. 5 depicts an exemplary interface 500 for displaying initiative details, according to some embodiments. Interface 500 may be launched when user computing device 110 interacts with view details 350, as depicted in FIG. 3. Interface 500 may be used to show additional metrics 320 and metric values 325 associated with an initiative 310. Interface 500 may display metrics 320 in various formats. For example, certain metrics 320-1 and metrics values 325-1 may be depicted as a graphic. In some embodiments, metrics 320-2 and metrics values 325-2 may be depicted as text. User computing device 110 may interact with and rearrange metrics 320 and metrics values 325 as depicted in interface 500.

As discussed above, metric 320 may include metric values 325 from multiple data provider systems 140. For example, initiative 310 may relate to increasing hospital profits. Analytics engine 130 may receive profit data from three hospitals (i.e., data provider system 140-1, 140-2, and 140-3). Analytics engine 130 may standardize the profit data from each data provider system 140 so that a single metric value may be displayed at interface 500. For example, each metric value 325 may be formatted to show profit per month. In some embodiments, interface 500 may be configured to provide user computing device 110 access to each metric value 325 from each data provider system 140. This may be useful to view disparities for a single metric 320 across multiple data provider systems 140.

Interface 500 may include notify team 510, refresh 520, and view initiatives 530. Notify team 510 may generate an alert to each user computing device 110 linked to initiative 310. The alert may include the metrics 320 and metric values 325 at interface 500. Refresh 520 may retrieve updated metric values 325 from analytics engine 130. View initiatives 530 may update the GUI to show interface 300.

Figure 6:
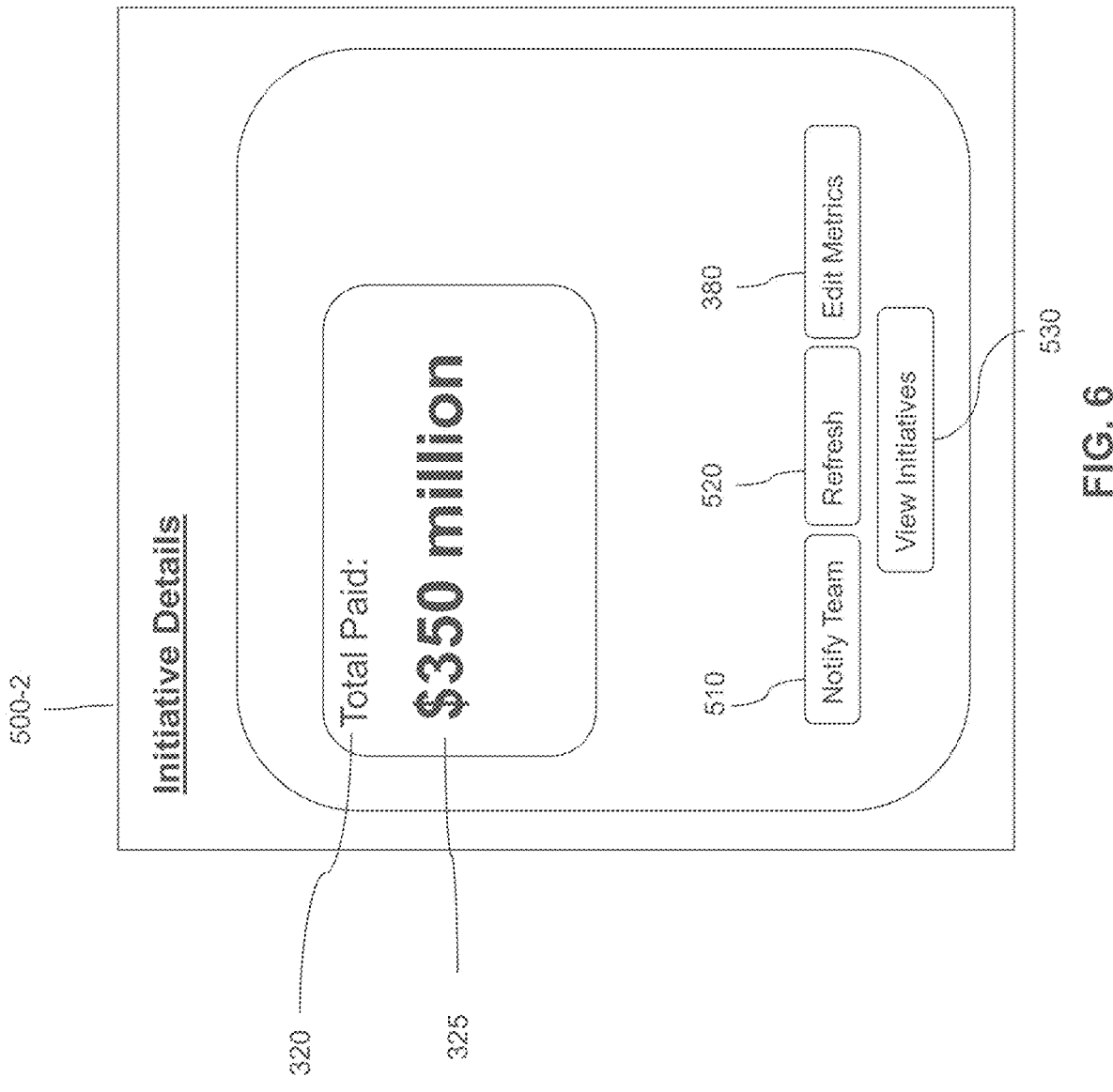
FIG. 6 depicts another exemplary interface for displaying initiative details, according to some embodiments.

FIG. 6 depicts another exemplary interface 500-2 for displaying initiative details, according to some embodiments. Interface 500-2 may be displayed when analytics engine 130 is accessed via user computing device 110 with a smaller screen (e.g., a cell phone). As a result, analytics engine 130 may prioritize what data to display. For example, if user computing device 110 has access to two initiatives 310-1 and 310-2, and initiative 310-1 has a metric 320-1 below a predefined threshold, analytics engine 130 may display initiative 310-1, metric 320-1, and metric value 325-1. In some embodiments, user computing device 110 may select an initiative 310, metric 320, and metric value 325 to always display. In some embodiments, analytics engine 130 may be configured to display initiative 310, metric 320, and metric value 325 that requires attention. For example, metric 325 may have passed a threshold value, causing an alert to be sent to user computing device 110. If user computing device 110 interacts with the link in the alert to access analytics engine 130, the link may cause interface 500-2 to be displayed. Interface 500-2 therefore enables a user to quickly access critical information without the need to sift through large amounts of data stored in data provider systems 140.

Figure 7:
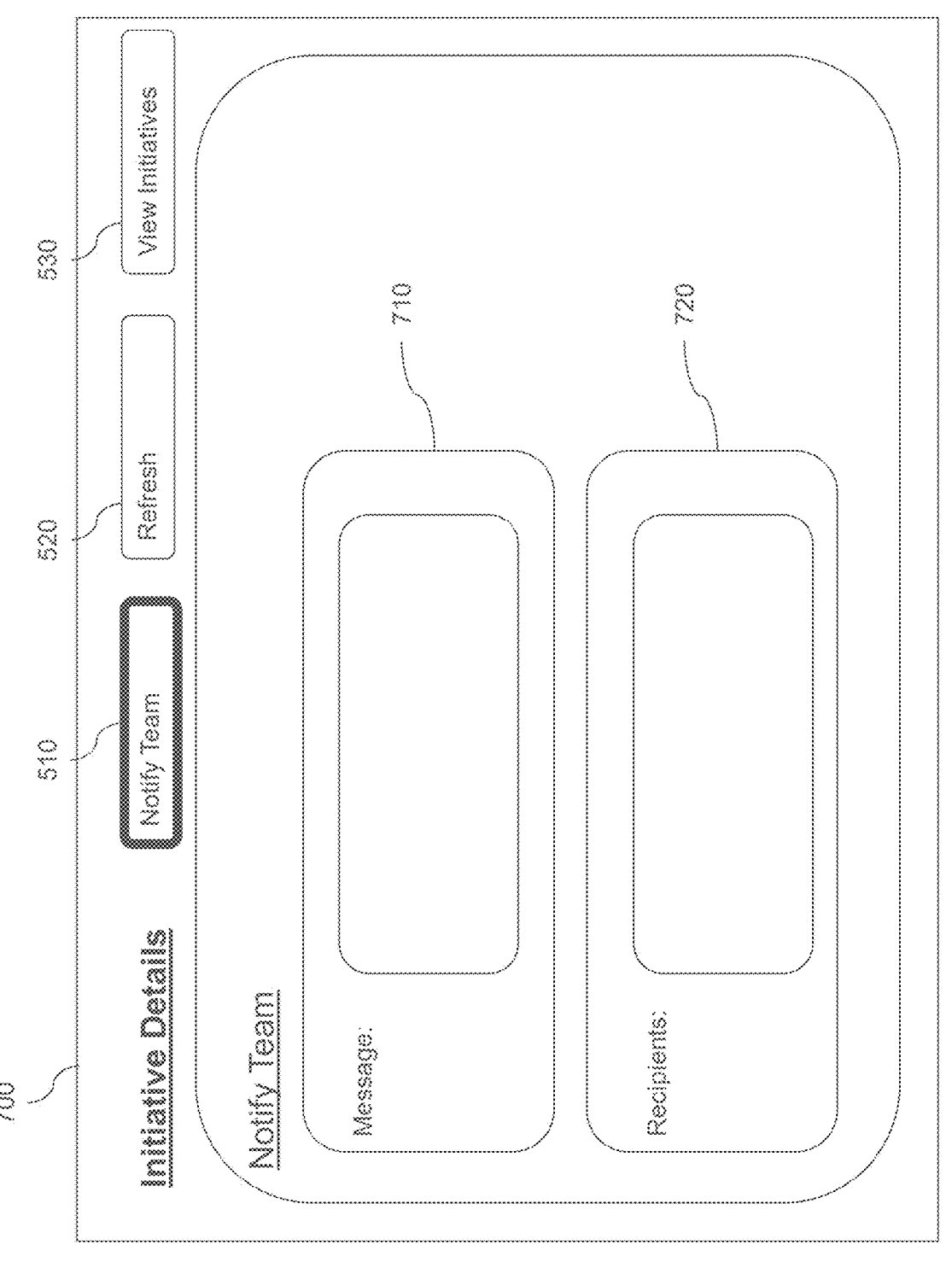
FIG. 7 depicts an exemplary interface for generating a notification for an initiative, according to some embodiments.

FIG. 7 depicts an exemplary interface 700 for generating a notification for an initiative, according to some embodiments. Interface 700 may be generated when user computing device 110 accesses notify team 510, as depicted in FIG. 5. Interface 700 includes message 710 and recipients 720. User computing device 110 may enter message 710 that will be received by recipients 720. Message 710 may include any input that user computing device 110 may transmit (e.g., text, audio, photograph, video). Within recipients 720, user computing device 110 may list identifiers associated with other user computing devices 110 designated to receive message 710. An identifier may be a name, phone number, employee ID, and/or email address. Analytics engine 130 may send the notification to each recipient listed via network 120.

Figure 8:
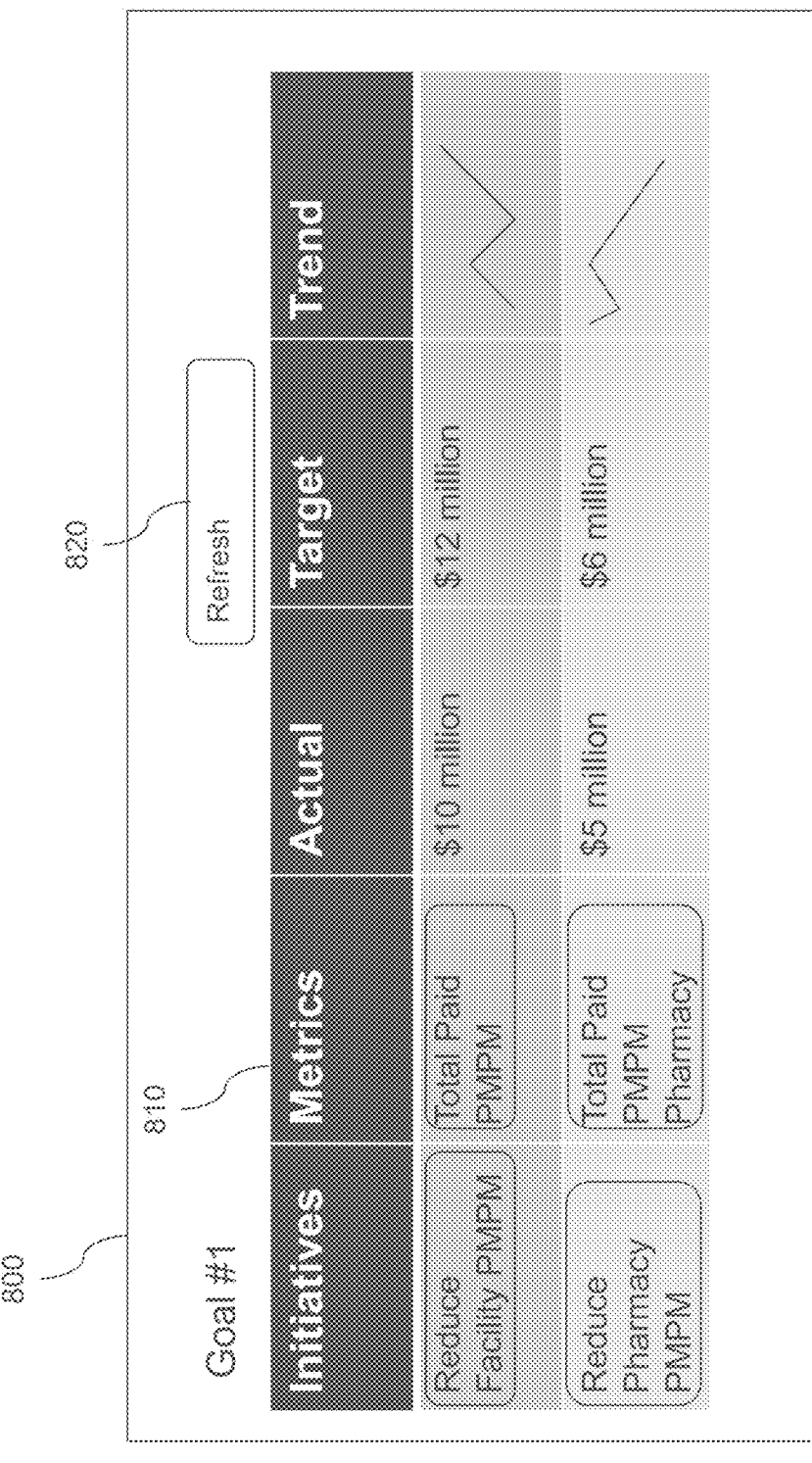
FIG. 8 depicts an exemplary interface for viewing a report, according to some embodiments.

FIG. 8 depicts an exemplary interface 800 for viewing a report, according to some embodiments. Interface 800 may display report 810. Report 810 may be depicted as a table including each initiative. Each initiative may include metrics associated with the initiative, current metric values, target metric values, and trend lines. Report 810 may be accessed by user computing device 110 connecting to analytics engine 130. In some embodiments, analytics engine 130 may be configured to generate and send report 810 to user computing device 110. Analytics engine 130 may generate and send report 810 to user computing device 110 at a predefined interval. In some embodiments, user computing device 110 may request that analytics engine 130 generate and send report 810. Refresh 820 may be a button configured to update report 810. For example, when a user selects refresh 820 user computing device 110, analytics engine 130 may retrieve updated metric values from data store 142, store them at local store 134, and update report 810 depicted in interface 800.

FIG. 9 is a flowchart illustrating an example process 900 for data prioritization, distribution, and management, according to some embodiments. Process 900 may be performed by processing logic that may comprise hardware (e.g., circuitry, dedicated logic, programmable logic, microcode, etc.), software (e.g., instructions executing on a processing device), or a combination thereof. One or more of the steps in FIG. 9 may be performed by analytics engine 130 and/or user computing device 110. In some embodiments, one or more of the steps shown in FIG. 9 may be omitted, repeated, and/or performed in a different order than the order shown in FIG. 9. Accordingly, the scope of the invention should not be considered limited to the specific arrangement of steps shown in FIG. 9. The steps shown in FIG. 9 may be implemented as computer-readable instructions stored on computer-readable media, where, when the instructions are executed, cause a processor to perform the process of FIG. 9.

At 910, analytics engine 130 generates a GUI in response to a request from a user computing device 110, where the request includes a location of user computer device 110. For example, user computing device 110 may connect to analytics engine 130. Analytics engine 130 may generate and cause to be displayed a GUI at user computing device 110. User computing device 110 may send its location to analytics engine 130. In some embodiments, analytics engine 130 may request user computing device's 110 location.

At 920, an interaction, via the GUI, is received comprising an identification of a first metric. The first metric may be a data point that user computing device 110 desires to track. As non-limiting examples, the first metric may be revenue per month or surgical waste measured over a period of time.

At 930, analytics engine 130 identifies a data source comprising the first metric. For example, analytics engine 130 may determine that a data provider system 140 includes the first metric received from user computing device 110. In some embodiments, analytics engine 130 may query the data provider system 140 to determine it includes the first metric. In some embodiments, analytics engine 130 may include a list including metrics and their respective data provider systems 140 on network 120.

At 940, analytics engine 130 retrieves a first metric value corresponding to the first metric. The first metric value may be a value corresponding to the first metric. For example, if the first metric is revenue per month, the first metric value may be $1,000,000. Analytics engine 130 may use query engine 132 to retrieve the first metric value. Analytics engine 130 may store the first metric value at local store 134.

At 950, analytics engine 130 may store the first metric value at a first local data store, wherein the first local data store is at a location closer to the user device location than the data source. The first local data store may be local store 134. Analytics engine 130 may identify the first local data store by determining the closest local store 134 to user computing device 110.

At 960, analytics engine 130 may customize the GUI according to the first metric and the first metric value. For example, the GUI on user computing device 110 may be customized to display the first metric and the first metric value retrieved by analytics engine 130. Analytics engine 130 may configure the GUI in various formats. For example, if analytics engine 130 is configured to store a single value for the first metric, it may display the first metric and value. In some embodiments, analytics engine 130 may be configured to store historical values for the first metric. In some embodiments, analytics engine 130 may cause the GUI to display a graph or plot of the first metric values.

Figure 10:
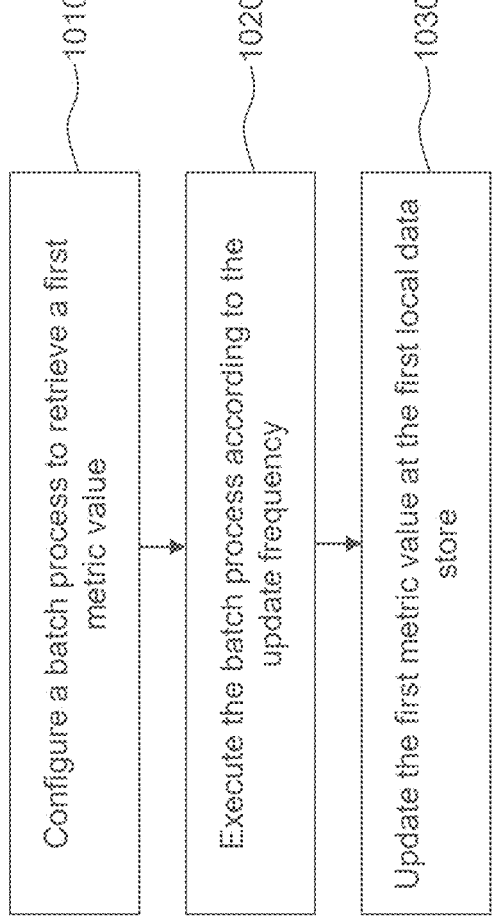
FIG. 10 is a flowchart illustrating an example process for using a batch process, according to some embodiments.

FIG. 10 is a flowchart illustrating an example process 1000 for using a batch process, according to some embodiments. Process 1000 may be performed by processing logic that may comprise hardware (e.g., circuitry, dedicated logic, programmable logic, microcode, etc.), software (e.g., instructions executing on a processing device), or a combination thereof. One or more of the steps in FIG. 10 may be performed by analytics engine 130 and/or user computing device 110. In some embodiments, one or more of the steps shown in FIG. 10 may be omitted, repeated, and/or performed in a different order than the order shown in FIG. 10. Accordingly, the scope of the invention should not be considered limited to the specific arrangement of steps shown in FIG. 10. The steps shown in FIG. 10 may be implemented as computer-readable instructions stored on computer-readable media, where, when the instructions are executed, cause a processor to perform the process of FIG. 10.

At 1010, analytics engine 130 configures a batch process to retrieve a first metric value. The batch process may include a first metric and an update frequency. The batch process may be used to automatically update data at local store 134. Analytics engine 130 may determine the first metric and update frequency. In some embodiments, user computing device 110 may set the first metric and update frequency.

At 1020, analytics engine executes the batch process according to the update frequency. In some embodiments, query engine 132 may retrieve the first metric value from data provider system 140. At 1030, analytics engine updates the first metric value at the first local data store. The first local data store may be local store 134. Utilizing a batch process may be beneficial to ensure that local store 134 has the latest data according to the update frequency.

Figure 11:
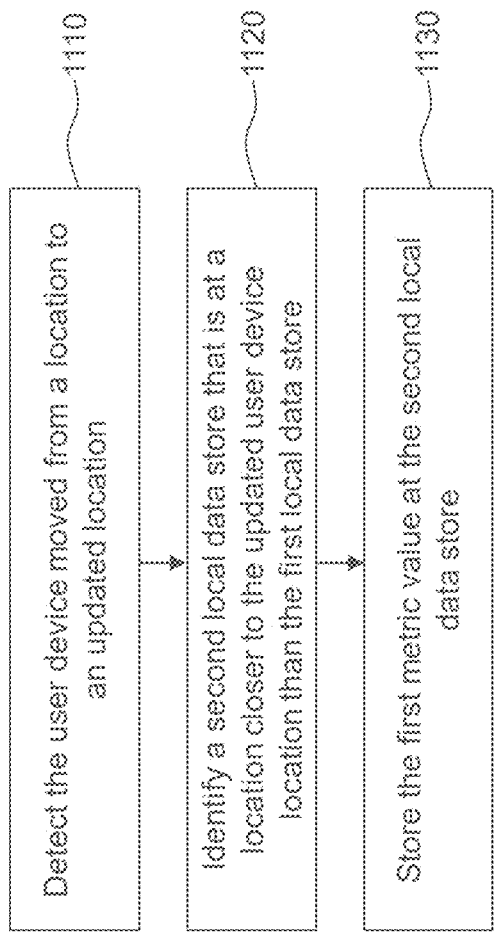
FIG. 11 is a flowchart illustrating an example process for utilizing device location, according to some embodiments.

FIG. 11 is a flowchart illustrating an example process 1100 for utilizing device location, according to some embodiments. Process 1100 may be performed by processing logic that may comprise hardware (e.g., circuitry, dedicated logic, programmable logic, microcode, etc.), software (e.g., instructions executing on a processing device), or a combination thereof. One or more of the steps in FIG. 11 may be performed by analytics engine 130 and/or user computing device 110. In some embodiments, one or more of the steps shown in FIG. 11 may be omitted, repeated, and/or performed in a different order than the order shown in FIG. 11. Accordingly, the scope of the invention should not be considered limited to the specific arrangement of steps shown in FIG. 11. The steps shown in FIG. 11 may be implemented as computer-readable instructions stored on computer-readable media, where, when the instructions are executed, cause a processor to perform the process of FIG. 11.

At 1110, analytics engine 130 detects the user computing device 110 has moved from a location to an updated location. Analytics device 130 may request user computing device's 110 location. User computing device 110 may be configured to automatically send its location to analytics engine 130 when it changes.

At 1120, analytics engine 130 may identify a second local data store that is at a location closer to the updated user device location than the first local data store. The second local data store may be identified by measuring the distance or response time between user computing device 110 and each local data store 134.

At 1130, analytics engine 130 stores the first metric value at the second local data store. Using the second local data store that is closer to user computing device 110 is beneficial to reduce latency in providing data to user computing device 110. Additionally, such an architecture helps to distribute network 120's load across multiple entities.

FIG. 12 is a flowchart illustrating an example process 1200 for utilizing a target metric value, according to some embodiments. Process 1200 may be performed by processing logic that may comprise hardware (e.g., circuitry, dedicated logic, programmable logic, microcode, etc.), software (e.g., instructions executing on a processing device), or a combination thereof. One or more of the steps in FIG. 12 may be performed by analytics engine 130. In some embodiments, one or more of the steps shown in FIG. 12 may be omitted, repeated, and/or performed in a different order than the order shown in FIG. 12. Accordingly, the scope of the invention should not be considered limited to the specific arrangement of steps shown in FIG. 12. The steps shown in FIG. 12 may be implemented as computer-readable instructions stored on computer-readable media, where, when the instructions are executed, cause a processor to perform the process of FIG. 12.

At 1210, analytics engine 130 receives a target metric value corresponding to the first metric. The target metric value may be set by user computing device 110. User computing device 110 may enter the target metric value via the GUI at user application 116. The target metric value may be used to determine initiative progress. For example, an initiative may be designed to decrease surgical waste and a target metric value may be set at $0 (i.e., no surgical waste).

At 1220, analytics engine 130 may calculate a difference between the target metric value and the first metric value. For example, if the first metric is surgical waste, the calculation may be the difference between current surgical waste and no surgical waste. At 1230, analytics engine 130 generates a report including the first metric, the first metric value, the target metric value, and the difference between the target metric value and the first metric value. In some embodiments, the report may include a graph depicting historical first metric values and the target metric value, allowing users to easily view initiative progress.

At 1240, analytics engine 130 sends the report to user computing device 110. Once received the report may be displayed within the GUI on the user device. Analytics engine 130 may send the report via network 120. In some embodiments, an alert may be transmitted with the report, which may cause display engine 114 to display user application 116 without any user interaction. This may be useful in a scenario where the report requires immediate attention. In some embodiments, the report may generate a notification (e.g., sound or vibration) on user computing device 110. In this case, a user may select the notification to display the report on user computing device 110.

FIG. 13 is a flowchart illustrating an example process 1300 for adding a second user to an initiative, according to some embodiments. Process 1300 may be used to add users to initiatives and define the level of access or permission they possess with respect to the initiative. For example, additional users may be able to view but not edit metrics within the initiative. Process 1300 may be performed by processing logic that may comprise hardware (e.g., circuitry, dedicated logic, programmable logic, microcode, etc.), software (e.g., instructions executing on a processing device), or a combination thereof. One or more of the steps in FIG. 13 may be performed by analytics engine 130. In some embodiments, one or more of the steps shown in FIG. 13 may be omitted, repeated, and/or performed in a different order than the order shown in FIG. 13. Accordingly, the scope of the invention should not be considered limited to the specific arrangement of steps shown in FIG. 13 The steps shown in FIG. 13 may be implemented as computer-readable instructions stored on computer-readable media, where, when the instructions are executed, cause a processor to perform the process of FIG. 13.

At 1310, analytics engine 130 receives an identifier associated with a second user computing device 110-2. The second user computing device 110-2 may be associated with a second user. Analytics engine 130 may receive the identifier from user computing device 110-1. The identifier may be any value to identify the second user device 110-2, such as a phone number, email address, or employer ID.

At 1320, analytics engine 130 assigns a permission scope to the second user device 110-2, wherein the permission scope is configured to block an interaction from second user device 110-2 with the GUI. Analytics engine 130 may receive the permission scope from user computing device 110-1 when it identifies second user device 110-2. The permission scope may be used to determine what interactions second user device 110-2 may take with respect to analytics engine 130. For example, second user device 110-2 may be allowed to view metrics but not edit them. In some embodiments, the permissions scope may allow second user device 110-2 to edit initiatives and metrics. At 1330, analytics engine 130 generates an alert comprising a link to access the GUI, wherein the link is unique to the identifier and permission scope associated with the second user device. In some embodiments, the link may be a URL to analytics engine 130.

At 1340, analytics engine 130 sends the alert to the second user device (e.g., user computing device 110-2). The alert may be sent over network 120.

At 1350, analytics engine 130 receive an interaction, via the GUI, from the second user device. The interaction may be to view the initiative details. In some embodiments, the interaction may be to add additional metrics to the initiative or to edit current initiatives. The interaction may be an action to notify other user computing devices 110 associated with the initiative.

At 1360, analytics engine 130 allows the interaction based on a determination that the interaction is allowed by the permission scope associated with the second user device. For example, analytics engine 130 may compare the interaction to the permission scope assigned to the second user device. If the interaction is allowed by the permission scope, analytics engine 130 may allow the interaction to proceed. For example, user computing device 110-1 may add user computing device 110-2 to an initiative and place no restrictions on its permissions. The interaction from user computing device 110-2 may be to add metric associated with the initiative. For example, the initiative may be to reduce surgical waste. The initiative may have a first metric associated with the value of material used during surgery. User computing device 110-2 may add an additional metric corresponding to surgery length. Since user computing device 110-2 has no permission restrictions, analytics engine 130 allows the metric to be added.

In some embodiments, analytics engine 130 may generate an alert or notification based on the interaction. For example, in the embodiment described above regarding adding a metric, analytics engine 130 may send a notification including the new metric to each user computing device 110. This may be beneficial so that each user computing device 110 has up to date information regarding the initiative. In some embodiments, if the interaction is outside the permission scope and blocked, analytics engine 130 may generate a notification to notify user computing device 110-1.

FIG. 14 is a flowchart illustrating an example process 1400 for using an initiative to identify additional metrics, according to some embodiments. Process 1400 may be performed by processing logic that may comprise hardware (e.g., circuitry, dedicated logic, programmable logic, microcode, etc.), software (e.g., instructions executing on a processing device), or a combination thereof. One or more of the steps in FIG. 14 may be performed by analytics engine 130 and/or user computing device 110. In some embodiments, one or more of the steps shown in FIG. 14 may be omitted, repeated, and/or performed in a different order than the order shown in FIG. 14. Accordingly, the scope of the invention should not be considered limited to the specific arrangement of steps shown in FIG. 14 The steps shown in FIG. 14 may be implemented as computer-readable instructions stored on computer-readable media, where, when the instructions are executed, cause a processor to perform the process of FIG. 14.

At 1410, analytics engine 130 receives identification of an initiative from user computing device 110. The initiative may be received via the GUI. The initiative may correspond to a problem or goal of the user or an organization with which the user is associated.

At 1420, analytics engine 130 determines, based on an analysis of the initiative, a second metric that is correlated with the initiative. For example, analytics engine 130 may utilize previously received initiatives and metrics associated with those initiatives to identify a second metric. In some embodiments, analytics engine 130 may use artificial intelligence and/or a machine learning model to identify the second metric.

For example, user computing device 110 may define an initiative to reduce surgical costs and elect to track average surgery length as a metric. Analytics engine 130 may look up an initiative from another user computing device 110 also aimed at reducing surgical costs. In that instance, the other user computing device 110 may have also relied on a metric related to the value of materials used during surgery. Analytics engine 130 may use this correlation to also track the value of materials used during surgery. The correlation may be based on the impact a metric has on an initiative. For example, an initiative aimed at reducing surgical costs may involve thousands of metrics. However, certain metrics may have more direct effects than others. As an example, although the average length of a surgery may increase surgical costs, the value of materials used may have a much greater effect. Therefore, the value of material used may be more important to track than the average length. In some embodiments, analytics engine 130 may send a notification to user computing device 110 that the second metric has been identified. In some embodiments, the user may prevent analytics engine 130 from adding the second metric. For example, the user may remove the second metric from the initiative via the GUI.

At 1430, analytics engine 130, periodically retrieves a second metric value corresponding to the second metric according to an update frequency associated with the second metric, where the update frequency associated with the second metric is greater than an update frequency associated with the first metric. For example, the second metric update frequency may be once per hour and the first metric update frequency may be once per day. The second metric may be updated more frequently than the first based on the determination that the second metric is more closely correlated with the initiative. Using the example above, analytics engine 130 may retrieve a metric for the value of material consumed during surgery more frequently than average surgery length.

FIG. 15 is a flowchart illustrating an example process 1500 for displaying multiple metrics, according to some embodiments. Process 1500 may be performed after process 1400, in which a second metric is linked to an initiative. Process 1500 may be performed by processing logic that may comprise hardware (e.g., circuitry, dedicated logic, programmable logic, microcode, etc.), software (e.g., instructions executing on a processing device), or a combination thereof. One or more of the steps in FIG. 15 may be performed by analytics engine 130 and/or user computing device 110. In some embodiments, one or more of the steps shown in FIG. 15 may be omitted, repeated, and/or performed in a different order than the order shown in FIG. 15.

Accordingly, the scope of the invention should not be considered limited to the specific arrangement of steps shown in FIG. 15 The steps shown in FIG. 15 may be implemented as computer-readable instructions stored on computer-readable media, where, when the instructions are executed, cause a processor to perform the process of FIG. 15.

At 1510, analytics engine 130 may customize the GUI by displaying the initiative, the second metric and the second metric value. This customization may be in response to determining that the second metric has a higher correlation or impact on the initiative than the first metric.

At 1520, analytics engine 130 may receive an interaction, via the GUI, with the displayed initiative. For example, the user may click the refresh button (e.g., refresh 365 of FIG. 3) or view the details button (e.g., view details 350 of FIG. 3).

At 1530, in response to the interaction, analytics engine 130 may retrieve updated first and second metric values. The updated first and second metric values may be retrieved from data provider systems 140.

At 1540, analytics engine 130 stores the updated first and second metric values at the first local data store. The updated first and second metric values may be stored at local store 134. This is beneficial to ensure that user computing device 110 has rapid access to the updated metric values.

At 1540, analytics engine 130 may update the GUI to display the initiative, the first metric, the updated first metric value, the second metric and the updated second metric value. This operation is beneficial to allow user computing device 110 to display both metrics tied to the initiative.

Figure 16:
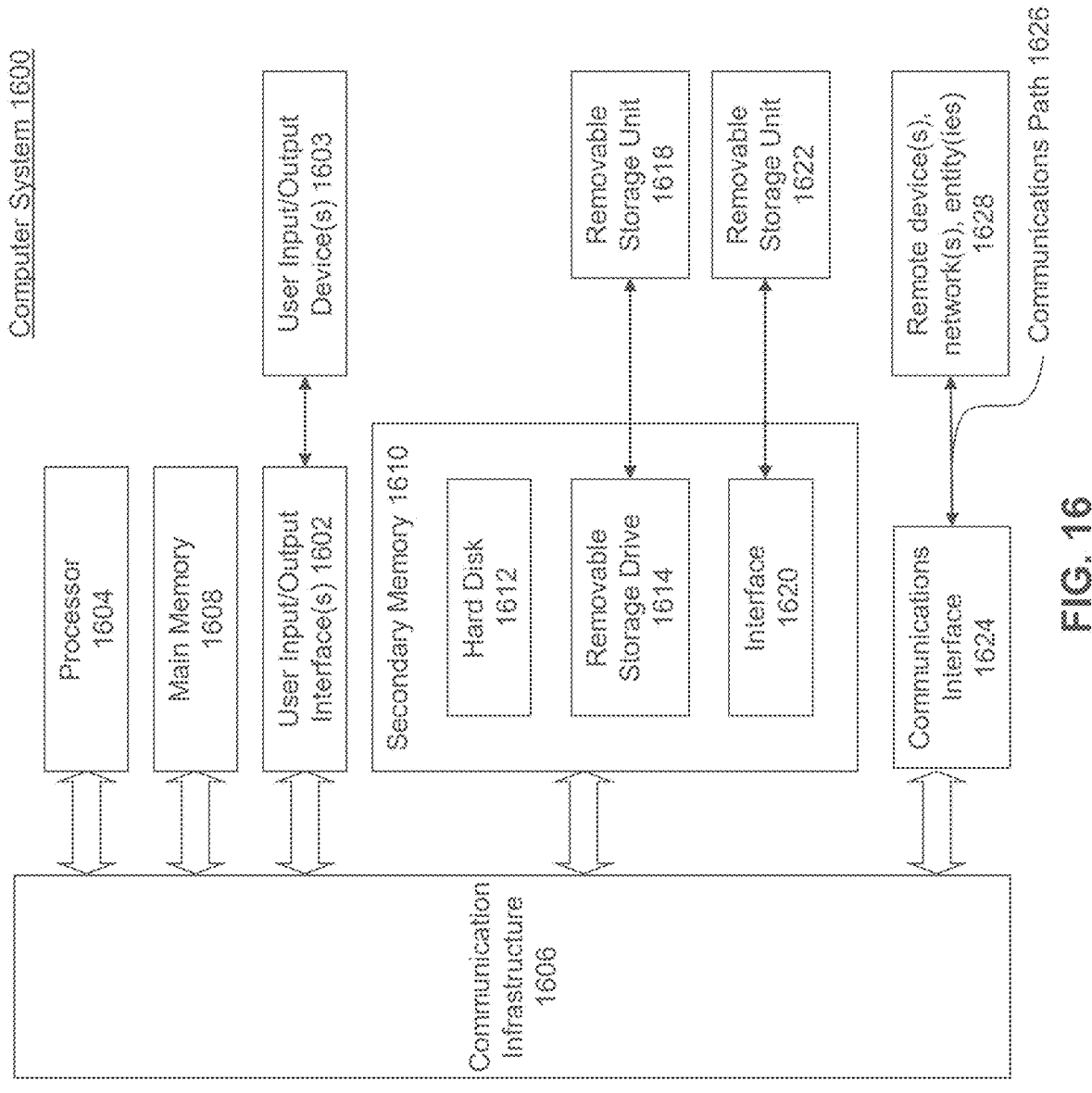
FIG. 16 depicts an example computer system useful for implementing various embodiments.

Various embodiments may be implemented, for example, using one or more well-known computer systems, such as computer system 1600 shown in FIG. 16. One or more computer systems 1600 may be used, for example, to implement any of the embodiments discussed herein, as well as combinations and sub-combinations thereof.

Computer system 1600 may include one or more processors (also called central processing units, or CPUs), such as a processor 1604. Processor 1604 may be connected to a communication infrastructure or bus 1606.

Computer system 1600 may also include user input/output device(s) 1603, such as monitors, keyboards, pointing devices, etc., which may communicate with communication infrastructure 1606 through user input/output interface(s) 1602.

One or more of processors 1604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1600 may also include a main or primary memory 1608, such as random access memory (RAM). Main memory 1608 may include one or more levels of cache. Main memory 1608 may have stored therein control logic (i.e., computer software) and/or data.

Computer system 1600 may also include one or more secondary storage devices or memory 1610. Secondary memory 1610 may include, for example, a hard disk drive 1612 and/or a removable storage device or drive 1614. Removable storage drive 1614 may be a floppy disk drive, a magnetic tape drive, a compact disk drive, an optical storage device, tape backup device, and/or any other storage device/drive.

Removable storage drive 1614 may interact with a removable storage unit 1618. Removable storage unit 1618 may include a computer usable or readable storage device having stored thereon computer software (control logic) and/or data. Removable storage unit 1618 may be a floppy disk, magnetic tape, compact disk, DVD, optical storage disk, and/any other computer data storage device. Removable storage drive 1614 may read from and/or write to removable storage unit 1618.

Secondary memory 1610 may include other means, devices, components, instrumentalities or other approaches for allowing computer programs and/or other instructions and/or data to be accessed by computer system 1600. Such means, devices, components, instrumentalities or other approaches may include, for example, a removable storage unit 1622 and an interface 1620. Examples of the removable storage unit 1622 and the interface 1620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1600 may further include a communication or network interface 1624. Communication interface 1624 may enable computer system 1600 to communicate and interact with any combination of external devices, external networks, external entities, etc. (individually and collectively referenced by reference number 1628). For example, communication interface 1624 may allow computer system 1600 to communicate with external or remote devices 1628 over communications path 1626, which may be wired and/or wireless (or a combination thereof), and which may include any combination of LANs, WANs, the Internet, etc. Control logic and/or data may be transmitted to and from computer system 1600 via communication path 1626.

Computer system 1600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1600, main memory 1608, secondary memory 1610, and removable storage units 1618 and 1622, as well as tangible articles of manufacture embodying any combination of the foregoing. Such control logic, when executed by one or more data processing devices (such as computer system 1600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 16. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:

generating, by one or more processors, a graphical user interface (GUI) in response to a request from a user device, wherein the request includes a location of the user device;

receiving, by the one or more processors, via the GUI, an initiative from the user device;

predicting, by the one or more processors, a plurality of metrics and a plurality of metric values relevant to the initiative using a machine learning model trained with prior initiatives and associated metrics and user-generated reinforcement scores, the plurality of metrics and the plurality of metric values stored at a plurality of different data sources;

identifying, by the one or more processors, a local data store based on the location, the local data store configured to serve users within a certain geographic proximity and the location being within the certain geographic proximity;

preemptively retrieving, by the one or more processors, the plurality of metrics and the plurality of metric values from the plurality of different data sources and storing the plurality of metrics and the plurality of metric values in the local data store;

in response to the storing, updating, by the one or more processors, the GUI to display the initiative, a first metric in the plurality of metrics, and a first metric value in the plurality of metric values, wherein the GUI retrieves the first metric and the first metric value from the local data store;

receiving, by the one or more processors, a target metric value corresponding to the first metric;

generating, by the one or more processors, a report including the first metric, the first metric value, the target metric value, and a difference between the target metric value and the first metric value;

sending, by the one or more processors, the report to the user device; and causing, by the one or more processors, the user device to display the report within the GUI.

2. The computer-implemented method of claim 1, further comprising:

detecting that the user device moved to a new location;

identifying a second local data store that is closer in proximity to the new location than the local data store; and storing the first metric value at the second local data store.

3. The computer-implemented method of claim 1, further comprising:

receiving, via the GUI, an identifier associated with a second user device;

assigning a permission scope to the second user device, wherein the permission scope is configured to block an interaction from the second user device with the GUI;

generating an alert comprising a link to access the GUI, wherein the link is unique to the identifier and the permission scope associated with the second user device, sending the alert to the second user device;

receiving, via the GUI, an interaction from the second user device; and allowing the interaction based on a determination that the interaction is allowed by the permission scope associated with the second user device.

4. The computer-implemented method of claim 1, further comprising:

determining, based on an analysis of the initiative, a second metric that is correlated with the initiative; and periodically retrieving a second metric value corresponding to the second metric according to an update frequency associated with the second metric, wherein the update frequency associated with the second metric is greater than an update frequency associated with the first metric.

5. The computer-implemented method of claim 4, further comprising:

customizing the GUI by displaying the initiative, the second metric, and the second metric value;

receiving an interaction, via the GUI, with the displayed initiative;

in response to receiving the interaction, retrieving an updated first metric value and an updated second metric value;

storing the updated first metric value and the updated second metric value at the local data store; and updating the GUI to display the initiative, the first metric, the updated first metric value, the second metric and the updated second metric value.

6. The computer-implemented method of claim 1, wherein the report further comprises a trend line generated based on the plurality of metric values.

7. A system, comprising:

a memory; and at least one processor coupled to the memory and configured to:

generate a graphical user interface (GUI) in response to a request from a user device, wherein the request includes a location of the user device;

receive, via the GUI, an initiative from the user device;

predict a plurality of metrics and a plurality of metric values relevant to the initiative using a machine learning model trained with prior initiatives and associated metrics and user-generated reinforcement scores, the plurality of metrics and the plurality of metric values stored at a plurality of different data sources;

identify a local data store based on the location, the local data store configured to serve users within a certain geographic proximity and the location being within the certain geographic proximity;

preemptively retrieve the plurality of metrics and the plurality of metric values from the plurality of different data sources and store the plurality of metrics and the plurality of metric values in the local data store;

in response to the storing, update the GUI to display the initiative, a first metric in the plurality of metrics, and a first metric value in the plurality of metric values, wherein the GUI retrieves the first metric and the first metric value from the local data store;

receive a target metric value corresponding to the first metric;

generate a report including the first metric, the first metric value, the target metric value, and a difference between the target metric value and the first metric value;

send the report to the user device; and cause the user device to display the report within the GUI.

8. The system of claim 7, wherein the at least one processor is further configured to:

configure a batch process to retrieve the first metric value, the batch process comprising an update frequency and the first metric;

execute the batch process according to the update frequency; and update the first metric value at the local data store.

9. The system of claim 7, wherein the at least one processor is further configured to:

detect that the user device moved to a new location;

identify a second local data store that is located closer in proximity to the new location than the local data store; and store the first metric value at the second local data store.

10. The system of claim 7, wherein the at least one processor is further configured to:

receive, via the GUI, an identifier associated with a second user device;

assign a permission scope to the second user device, wherein the permission scope is configured to block an interaction from the second user device with the GUI;

generate an alert comprising a link to access the GUI, wherein the link is unique to the identifier and the permission scope associated with the second user device;

send the alert to the second user device;

receive, via the GUI, an interaction from the second user device; and allow the interaction based on a determination that the interaction is allowed by the permission scope associated with the second user device.

11. The system of claim 7, wherein the at least one processor is further configured to:

determine, based on an analysis of the initiative, a second metric that is correlated with the initiative; and periodically retrieve a second metric value corresponding to the second metric according to an update frequency associated with the second metric, wherein the update frequency associated with the second metric is greater than an update frequency associated with the first metric.

12. The system of claim 11, wherein the at least one processor is further configured to:

customize the GUI by displaying the initiative, the second metric, and the second metric value;

receive an interaction, via the GUI, with the displayed initiative;

in response to receiving the interaction, retrieve an updated first metric value and an updated second metric value;

store the updated first metric value and the updated second metric value at the local data store; and update the GUI to display the initiative, the first metric, the updated first metric value, the second metric and the updated second metric value.

13. The system of claim 7, wherein the report further comprises a trend line generated based on the plurality of metric values.

14. A non-transitory computer-readable device having instructions stored thereon that, when executed by at least one computing device, cause the at least one computing device to perform operations comprising:

generating a graphical user interface (GUI) in response to a request from a user device, wherein the request includes a location of the user device;

receiving, via the GUI, an initiative from the user device;

predicting a plurality of metrics and a plurality of metric values relevant to the initiative using a machine learning model trained with prior initiatives and associated metrics and user-generated reinforcement scores, the plurality of metrics and the plurality of metric values stored at a plurality of different data sources;

identifying a local data store based on the location, the local data store configured to serve users within a certain geographic proximity and the location being within the certain geographic proximity;

preemptively retrieving the plurality of metrics and the plurality of metric values from the plurality of different data sources and storing the plurality of metrics and the plurality of metric values in the local data store;

in response to the storing, updating the GUI to display the initiative, a first metric in the plurality of metrics, and a first metric value in the plurality of metric values, wherein the GUI retrieves the first metric and the first metric value from the local data store;

receiving a target metric value corresponding to the first metric;

generating a report including the first metric, the first metric value, the target metric value, and a difference between the target metric value and the first metric value;

sending the report to the user device; and causing the user device to display the report within the GUI.

15. The non-transitory computer-readable device of claim 14, the operations further comprising:

configuring a batch process to retrieve the first metric value, the batch process comprising an update frequency and the first metric;

executing the batch process according to the update frequency; and updating the first metric value at the local data store.

16. The non-transitory computer-readable device of claim 14, the operations further comprising:

detecting that the user device moved to a new location;

identifying a second local data store that is located closer in proximity to the new location than the local data store; and storing the first metric value at the second local data store.

17. The non-transitory computer-readable device of claim 14, the operations further comprising:

receiving, via the GUI, an identifier associated with a second user device;

assigning a permission scope to the second user device, wherein the permission scope is configured to block an interaction from the second user device with the GUI;

generating an alert comprising a link to access the GUI, wherein the link is unique to the identifier and the permission scope associated with the second user device, sending the alert to the second user device;

receiving, via the GUI, an interaction from the second user device; and

allowing the interaction based on a determination that the interaction is allowed by the permission scope associated with the second user device.

18. The non-transitory computer-readable device of claim 14, the operations further comprising:

determining, based on an analysis of the initiative, a second metric that is correlated with the initiative; and periodically retrieving a second metric value corresponding to the second metric according to an update frequency associated with the second metric, wherein the update frequency associated with the second metric is greater than an update frequency associated with the first metric.

19. The non-transitory computer-readable device of claim 18, the operations further comprising:

customizing the GUI by displaying the initiative, the second metric, and the second metric value;

receiving an interaction, via the GUI, with the displayed initiative;

in response to receiving the interaction, retrieving an updated first metric value and an updated second metric value;

storing the updated first metric value and the updated second metric value at the local data store; and updating the GUI to display the initiative, the first metric, the updated first metric value, the second metric and the updated second metric value.

20. The non-transitory computer-readable device of claim 14, wherein the report further comprises a trend line generated based on the plurality of metric values.

* * * * *